(12) United States Patent
Glassman

(10) Patent No.: US 12,269,214 B2
(45) Date of Patent: Apr. 8, 2025

(54) METHOD AND SYSTEM FOR THREE-DIMENSIONAL PRINTING

(71) Applicant: Stratasys Ltd., Rehovot (IL)

(72) Inventor: Barak Glassman, Nes Ziona (IL)

(73) Assignee: Stratasys Ltd., Rehovot (IL)

( * ) Notice: Subject to any disclaimer, the term of this patent is extended or adjusted under 35 U.S.C. 154(b) by 510 days.

(21) Appl. No.: 17/419,817

(22) PCT Filed: Dec. 30, 2019

(86) PCT No.: PCT/IL2019/051438
§ 371 (c)(1),
(2) Date: Jun. 30, 2021

(87) PCT Pub. No.: WO2020/141518
PCT Pub. Date: Jul. 9, 2020

(65) Prior Publication Data
US 2022/0080665 A1    Mar. 17, 2022

Related U.S. Application Data

(60) Provisional application No. 62/786,577, filed on Dec. 31, 2018.

(51) Int. Cl.
*B29C 64/35*   (2017.01)
*B29C 64/112*  (2017.01)
(Continued)

(52) U.S. Cl.
CPC ............ *B29C 64/35* (2017.08); *B29C 64/112* (2017.08); *B29C 64/209* (2017.08);
(Continued)

(58) Field of Classification Search
None
See application file for complete search history.

(56) References Cited

U.S. PATENT DOCUMENTS

| 6,259,962 B1 | 7/2001 | Gothait |
| 6,569,373 B2 | 5/2003 | Napadensky |

(Continued)

FOREIGN PATENT DOCUMENTS

| CN | 106515013 | 3/2017 |
| EP | 1938952   | 7/2008 |

(Continued)

OTHER PUBLICATIONS

Matzner EP3253560A1 English Translation 2017, Equivalent to US-2018029291A1 (Year: 2017).*

(Continued)

*Primary Examiner* — Jacob T Minskey
*Assistant Examiner* — Adrien J Bernard

(57) ABSTRACT

A method of three-dimensional printing, comprises: operating a printing head having a nozzle array to dispense a building material formulation, wherein the printing head is directly connected to a cartridge containing the building material formulation, and wherein the printing head comprises a channel conveying a building material formulation received from the cartridge to the nozzle array; discarding the building material formulation from the channel; and connecting a cartridge containing a building material formulation that is different from the discarded building material formulation to the channel.

20 Claims, 7 Drawing Sheets

(51) Int. Cl.

| | | |
|---|---|---|
| | *B29C 64/209* | (2017.01) |
| | *B29C 64/393* | (2017.01) |
| | *B33Y 10/00* | (2015.01) |
| | *B33Y 30/00* | (2015.01) |
| | *B33Y 40/00* | (2020.01) |
| | *B33Y 50/02* | (2015.01) |
| | *B33Y 70/00* | (2020.01) |

(52) U.S. Cl.
CPC ............ *B29C 64/393* (2017.08); *B33Y 10/00* (2014.12); *B33Y 30/00* (2014.12); *B33Y 40/00* (2014.12); *B33Y 50/02* (2014.12); *B33Y 70/00* (2014.12); *B29K 2995/0046* (2013.01); *B29K 2995/0092* (2013.01); *B29K 2995/0093* (2013.01)

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,479,510 B2 | 1/2009 | Napadensky et al. |
| 7,500,846 B2 | 3/2009 | Eshed et al. |
| 7,962,237 B2 | 6/2011 | Kritchman |
| 9,031,680 B2 | 5/2015 | Napadensky |
| 2006/0127153 A1 | 6/2006 | Menchik et al. |
| 2010/0191360 A1 | 7/2010 | Napadensky et al. |
| 2013/0073068 A1 | 3/2013 | Napadensky |
| 2018/0029291 A1 | 2/2018 | Matzner et al. |
| 2018/0071984 A1 | 3/2018 | Lee et al. |
| 2018/0111336 A1* | 4/2018 | Mantell ............... B05C 5/02 |

FOREIGN PATENT DOCUMENTS

| | | | |
|---|---|---|---|
| EP | 2199066 | 6/2010 | |
| IL | 3253560 A1 * | 12/2017 | ............ B29C 67/00 |
| JP | 2018-2768 | 1/2018 | |
| JP | 2018-115243 | 7/2018 | |
| JP | 2018-199336 | 12/2018 | |
| JP | 2019-521015 | 7/2019 | |
| JP | 2019-521883 | 8/2019 | |
| JP | 2019-529183 | 10/2019 | |
| WO | WO 2018/015553 | 1/2018 | |
| WO | WO 2018/055522 | 3/2018 | |
| WO | WO 2020/141518 | 7/2020 | |

OTHER PUBLICATIONS

English Summary Dated Mar. 30, 2023 of Notification of Office Action and Search Report Dated Mar. 24, 2023 From the State Intellectual Property Office of the People's Republic of China Re. Application No. 201980090056.1 (1 page).

Translation Dated Mar. 30, 2023 of Notification of Office Action and Search Report Dated Mar. 24, 2023 From the State Intellectual Property Office of the People's Republic of China Re. Application No. 201980090056.1 (2 pages).

Notification of Office Action and Search Report Dated Mar. 24, 2023 From the State Intellectual Property Office of the People's Republic of China Re. Application No. 201980090056.1 (3 Pages).

International Preliminary Report on Patentability Dated Jul. 15, 2021 From the International Bureau of WIPO Re. Application No. PCT/IL2019/051438. (10 Pages).

International Search Report and the Written Opinion Dated Mar. 23, 2020 From the International Searching Authority Re. Application No. PCT/IL2019/051438. (15 Pages).

Communication Pursuant to Article 94(3) EPC Dated Sep. 27, 2022 From the European Patent Office Re. Application No. 19836595.9. (6 pages).

Notification of Office Action and Search Report Dated Aug. 24, 2022 From the State Intellectual Property Office of the People's Republic of China Re. Application No. 201980090056.1 and Its Summary in English. (11 Pages).

Communication Pursuant to Article 94(3) EPC Dated Jan. 5, 2024 From the European Patent Office Re. Application No. 19836595.9 (5 Pages).

Office Action Dated Jun. 13, 2024 From the Israel Patent Office Re. Application No. 284507. (4 Pages).

Translation Dated Oct. 6, 2023 of Notice of Reason(s) for Rejection Dated Sep. 19, 2023 From the Japan Patent Office Re. Application No. 2021-536306. (5 pages).

Notice of Reason(s) for Rejection Dated Sep. 19, 2023 From the Japan Patent Office Re. Application No. 2021-536306. (3 pages).

Supplementary European Search Report and the European Search Opinion Dated Jun. 7, 2024 From the European Patent Office Re. Application No. 24150272.3. (10 Pages).

* cited by examiner

METHOD AND SYSTEM FOR THREE-DIMENSIONAL PRINTING

RELATED APPLICATIONS

This application is a National Phase of PCT Patent Application No. PCT/IL2019/051438 having International filing date of Dec. 30, 2019, which claims the benefit of priority under 35 USC § 119 (e) of U.S. Provisional Patent Application No. 62/786,577 filed on Dec. 31, 2018. The contents of the above applications are all incorporated by reference as if fully set forth herein in their entirety.

FIELD AND BACKGROUND OF THE INVENTION

The present invention, in some embodiments thereof, relates to printing and, more particularly, but not exclusively, to a method and system for three-dimensional printing.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

SUMMARY OF THE INVENTION

According to an aspect of some embodiments of the present invention there is provided a method of three-dimensional printing. The method comprises operating a printing head having a nozzle array to dispense a building material formulation, wherein the printing head is directly connected to a cartridge containing the building material formulation, and wherein the printing head comprises a channel conveying a building material formulation received from the cartridge to the nozzle array; discarding the building material formulation from the channel; and connecting a cartridge containing a building material formulation that is different from the discarded building material formulation to the channel.

According to some embodiments of the invention the printing head has a plurality of nozzle arrays dispensing at least two different building material formulations, wherein the printing head is directly connected to a plurality of cartridges each containing a different building material formulation, and wherein the printing head comprises a manifold with a plurality of channels, each conveying a building material formulation received from a separate cartridge to a separate nozzle array.

According to some embodiments of the invention the discarding is of a first building material formulation from a first channel of the manifold, and wherein the connecting is while maintaining at least one type of building material formulation within at least one channel of the manifold other than the first channel.

According to some embodiments of the invention at least one building material formulation is characterized by a viscosity of no more than 50 cPs at 25° C.

According to some embodiments of the invention at least one building material formulation is a modeling material formulation system which comprises at least two curable materials and featuring a viscosity of no more than 50 cPs at 25° C., wherein an average molecular weight of the at least two curable materials is no more than 500 grams/mol.

According to some embodiments of the invention the formulation system comprises at least one formulation which, when hardened, provides a non-elastomeric material, the at least one formulation comprising: at least one hydrophobic curable material which provides, when hardened, a material featuring Tg higher than 80° C.; and at least one hydrophilic curable material which provides, when hardened, a material featuring Tg higher than 80° C.

According to some embodiments of the invention the formulation system comprises at least one formulation which, when hardened, provides an elastomeric material, the at least one formulation comprising: an elastomeric curable material; and a monofunctional curable material.

According to some embodiments of the invention the at least one formulation comprises a difunctional curable material.

According to an aspect of some embodiments of the present invention there is provided a three-dimensional printing system. The system comprises a plurality of cartridges each containing a different building material formulation, a printing head having a plurality of nozzle arrays, and being directly connected to the plurality of cartridges, wherein the printing head comprises a manifold with a plurality of channels, each conveying a building material formulation received from a separate cartridge to a separate nozzle array, and a controller for operating the printing head. According to preferred embodiments of the invention the three-dimensional printing system is devoid of any printing head which is not directly connected to the plurality of cartridges.

According to some embodiments of the invention the system comprises a plurality of flow controlling devices, wherein the controller is configured to selectively control the flow controlling devices.

According to some embodiments of the invention a number of the cartridges is larger than a number of the nozzles, and the manifold comprises M entry ports and N exit ports, wherein M>N, wherein M is a number of the cartridges, and wherein N is a number of the nozzle arrays.

According to some embodiments of the invention the system comprises a plurality of flow controlling devices, wherein the controller is configured to selectively control the flow controlling devices, to prevent flow of building material formulation out of at least one of the cartridges.

According to some embodiments of the invention the controller is configured to operate at least one of the nozzle arrays to discard building material formulation from a respective channel, at a predetermined location, and to operate a flow controlling device to establish flow of building material formulation that is different from the discarded building material formulation into the respective channel.

According to some embodiments of the invention the discarding is of a first building material formulation from a first channel of the manifold via a first nozzle array, and wherein the establishing the flow is for a second building material formulation while maintaining at least one type of building material formulation within at least one channel of the manifold other than the first channel.

According to some embodiments of the invention the controller is configured to control the first nozzle array to dispense the first building material formulation and the second building material formulation at locations belonging to the same layer but during different passes of the printing head over the layer.

According to some embodiments of the invention the predetermined location is on a working surface outside an area of the working surface at which a three-dimensional object is fabricated by the system.

According to some embodiments of the invention the predetermined location is at an internal region of a three-dimensional object fabricated by the system.

According to some embodiments of the invention the predetermined location in in sacrificial region within a volume in which a three-dimensional object is fabricated by the system.

According to some embodiments of the invention the system is devoid of any pre-heating systems that heat the building material outside the printing head.

According to some embodiments of the invention the printing head is configured to dispense the building material formulation at a temperature of less than 50° C.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
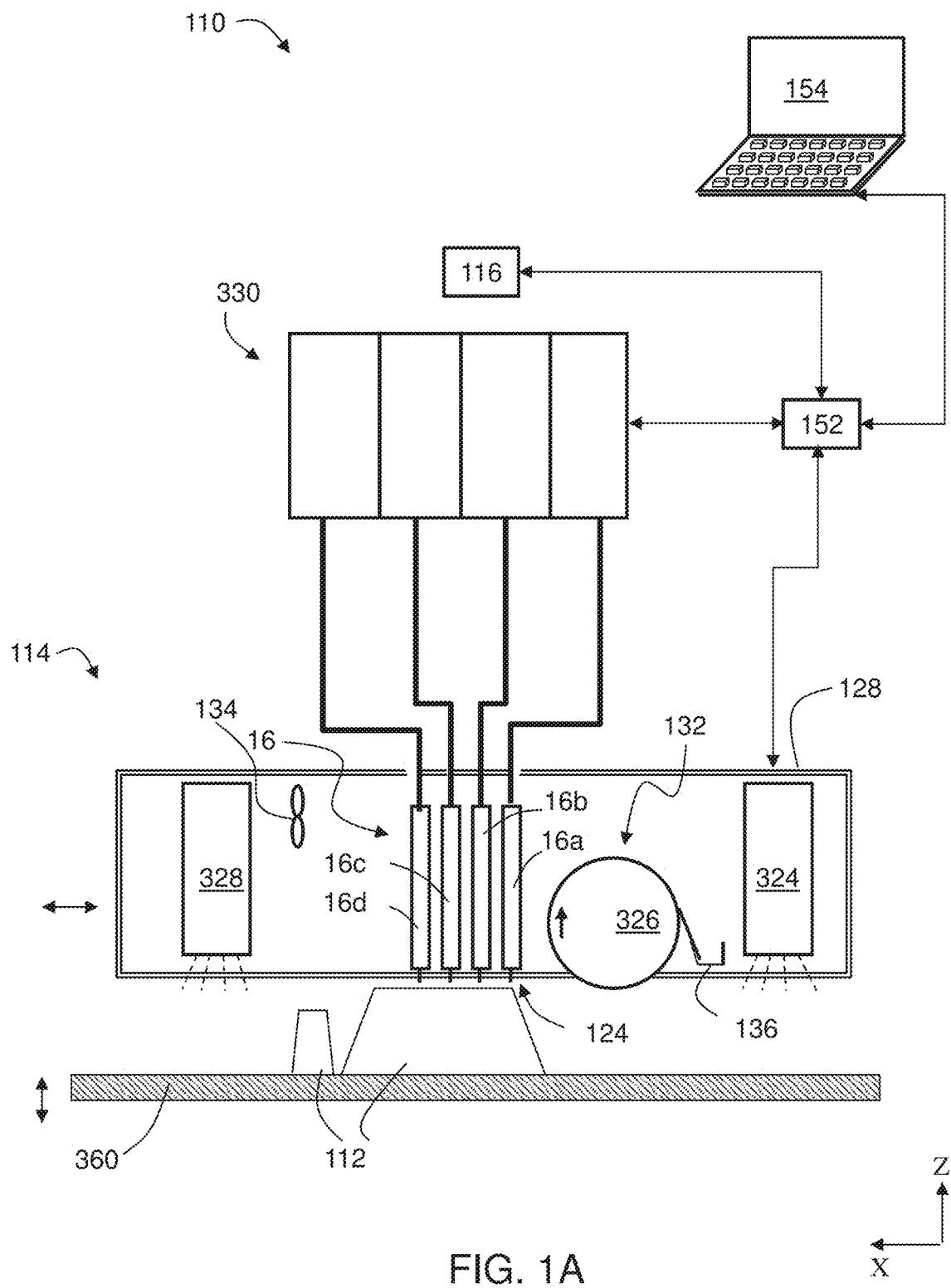
FIGS. 1A-D are schematic illustrations of an additive manufacturing system according to some embodiments of the invention.

The present invention, in some embodiments thereof, relates to printing and, more particularly, but not exclusively, to a method and system for three-dimensional printing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, an OBJ File format (OBJ), a 3D Manufacturing Format (3 MF), Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a printing head having one or more arrays of nozzles to deposit building material formulation in layers on a supporting structure. The AM apparatus thus dispenses building material formulation in target locations which are to be occupied and leaves other target locations void. The apparatus typically includes a plurality of arrays of nozzles, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different array of nozzles (belonging to the same or different printing heads) of the AM apparatus. In some embodiments, two or more such arrays of nozzles that dispense different modeling material formulations are both located in the same printing head of the AM apparatus. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are both located in separate the same printing head.

Figure 2A:
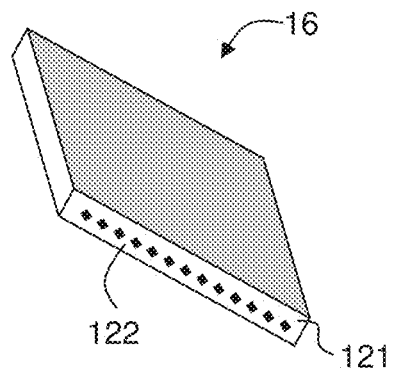
FIGS. 2A-2C are schematic illustrations of printing heads according to some embodiments of the present invention.
Figure 2B:
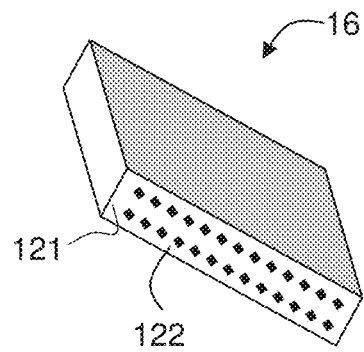
Figure 2C:
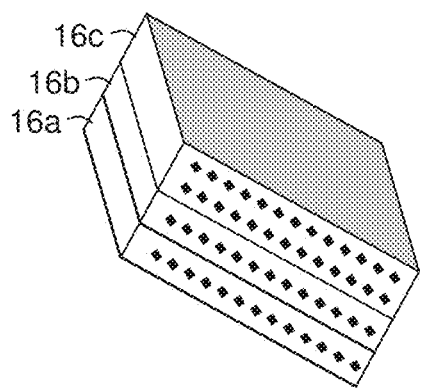

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays of nozzles 122, typically mounted on an orifice plate 121, as illustrated in FIGS. 2A-C described below, through which a liquid building material formulation 124 is dispensed.

Preferably, but not obligatorily, apparatus 114 is a three-dimensional printing apparatus, in which case the printing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each printing head is optionally and preferably fed via one or more building material formulation reservoirs which may optionally include a temperature control unit (e.g., a temperature sensor and/or a heating device), and a material formulation level sensor. To dispense the building material formulation, a voltage signal is applied to the printing heads to selectively deposit droplets of material formulation via the printing head nozzles, for example, as in piezoelectric inkjet printing technology. The dispensing rate of each head depends on the number of nozzles, the type of nozzles and the applied voltage signal rate (frequency). Use of thermal printing heads are also considered in connection with the present invention. Both piezoelectric and thermal printing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four printing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense one modeling material formulation, head 16b can dispense another modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material formulation printing heads (modeling heads) and the number of support material formulation printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein throughout the term "about" refers to ±10%.

For example, for a=1, the overall dispensing rate of support material formulation is generally the same as the overall dispensing rate of the modeling material formulation when all the arrays of nozzles operate.

Apparatus 114 can comprise, for example, M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

In addition to solidifying device 324, apparatus 114 optionally and preferably comprises an additional radiation source 328 for solvent evaporation. Radiation source 328 optionally and preferably generates infrared radiation. In various exemplary embodiments of the invention solidifying device 324 comprises a radiation source generating ultraviolet radiation, and radiation source 328 generates infrared radiation.

In some embodiments of the present invention apparatus 114 comprises cooling system 134 such as one or more fans or the like.

The printing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the printing heads to at least partially cure or solidify the material formulations just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the printing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the printing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the printing heads, the layer thus formed may be straightened by leveling device 326, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A control unit 152 controls fabrication apparatus 114 and optionally and preferably also supply system 330. Control unit 152 typically includes an electronic circuit configured to perform the controlling operations. Control unit 152 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each printing head or each nozzle array and the temperature of the building material formulation in the respective printing head or respective nozzle array.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
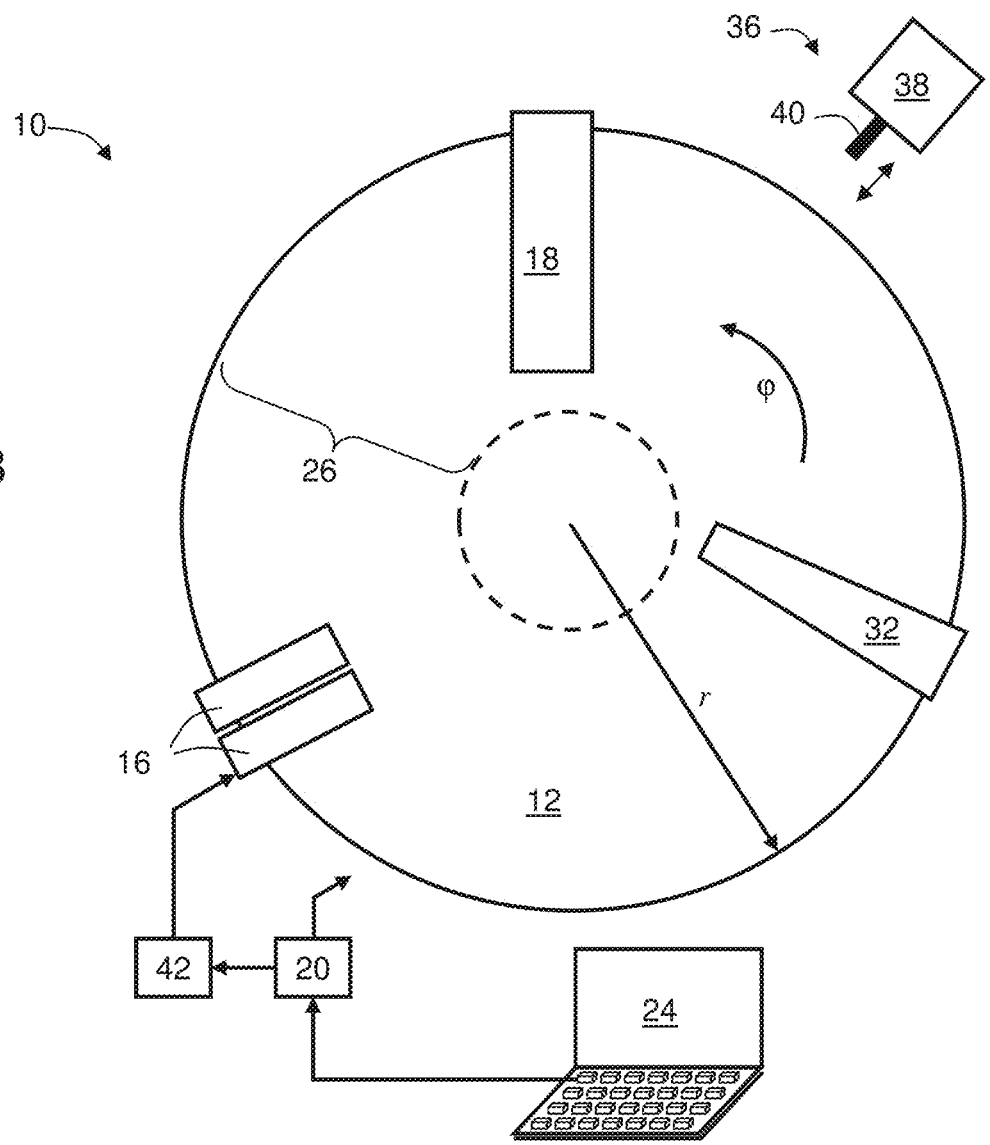
Figure 1C:
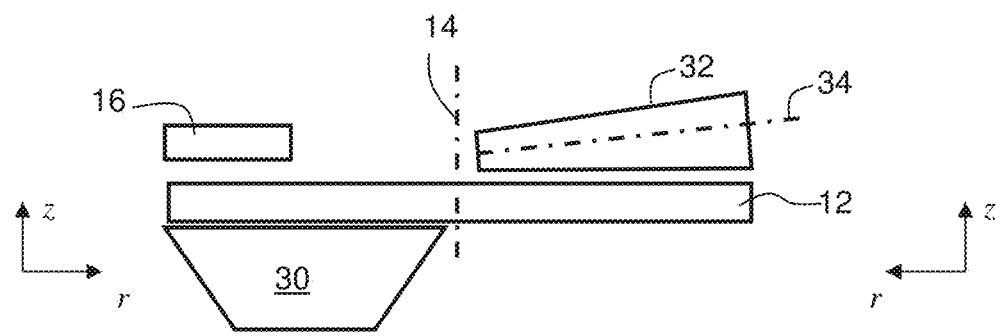
Figure 1D:
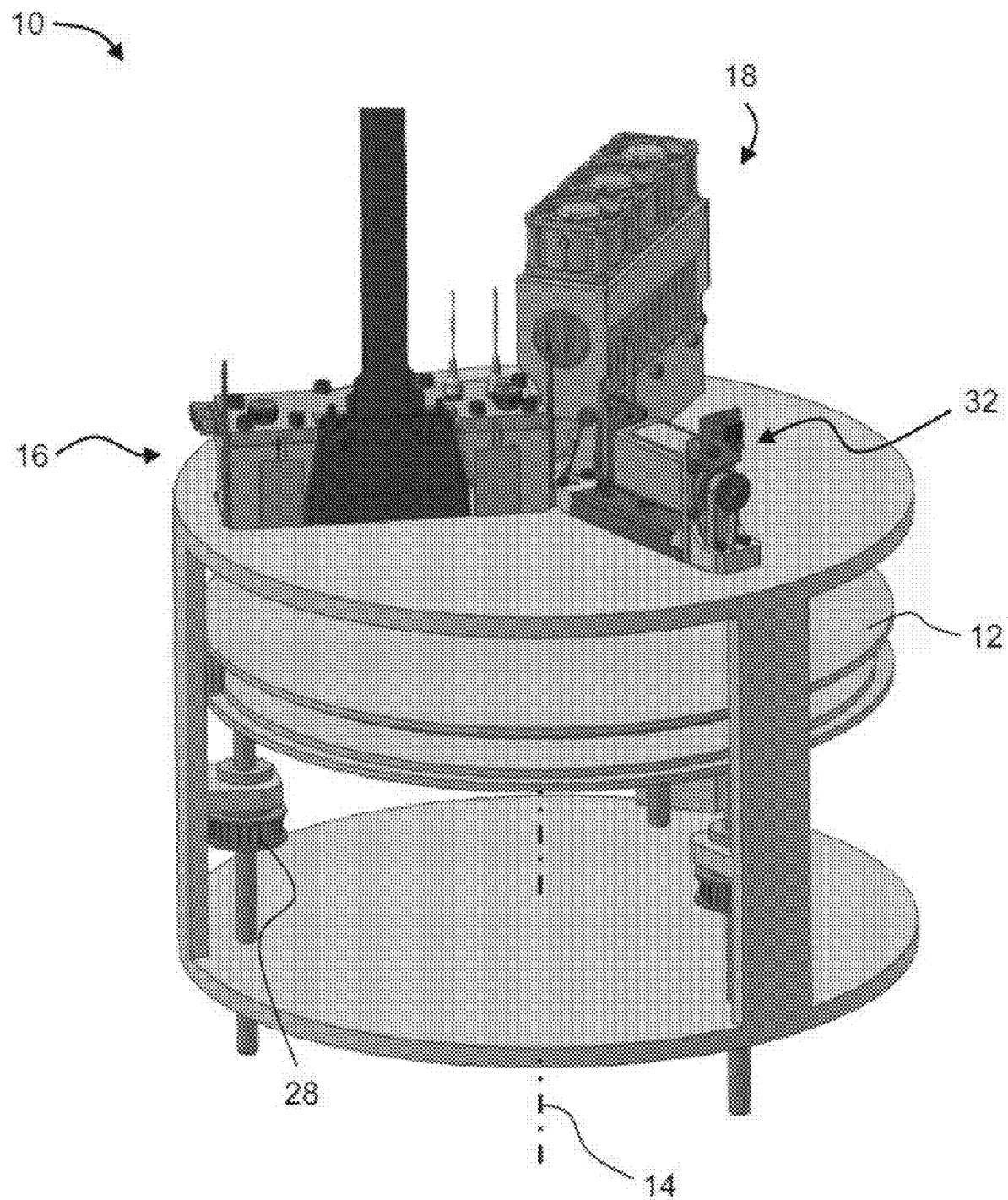

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
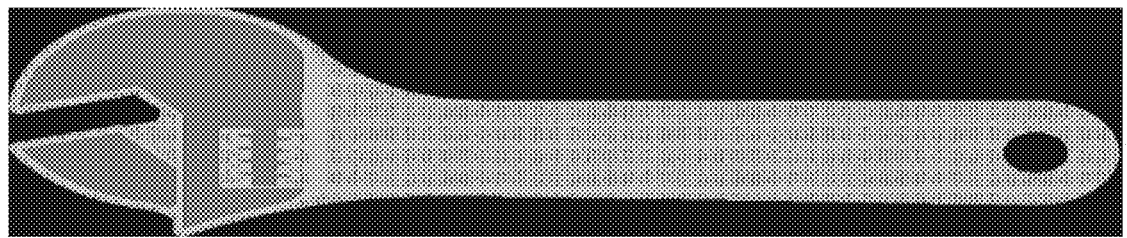
FIGS. 3A and 3B are schematic illustrations demonstrating coordinate transformations according to some embodiments of the present invention.
Figure 3B:
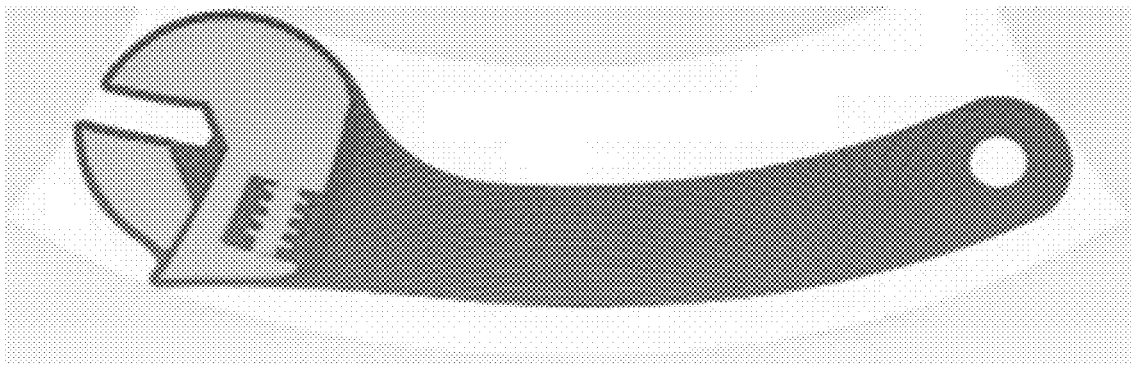

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different arrays of nozzles (belonging to the same or different printing head). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application No. 20100191360, the contents of which are hereby incorporated by reference.

A typical inkjet printing head comprises a manifold having one or more channels, each conveying a liquid material formulation to a separate printing head nozzle array for dispensing of the respective formulation by the respective nozzle array. The nozzle array is mounted on a printing head orifice plate and comprises a plurality of nozzles each having a cell cavity for holding an amount of material formulation for dispensing and an outlet port through which the material formulation is dispensed. The cell cavities of all the nozzles in a particular nozzle array are typically fluidly connected to a particular and separate channel of the head's manifold.

Figure 4:
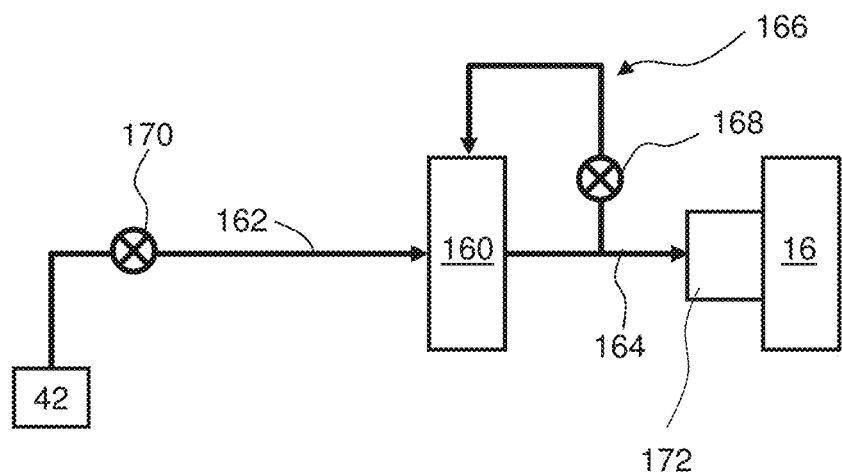
FIG. 4 is a schematic illustration of a typical pre-heating process.

In many conventional three-dimensional printing system, the building material formulation is pre-heated, before entering the head's manifold, to a working temperature that is suitable for the building material and the printing head. The pre-heating is typically in addition to the heating effected within the printing heads. A typical pre-heating process is illustrated in FIG. 4. A pre-heater element 160 is positioned at the fluid path between the material supply 42 (or 330) and head 16. Pre-heater element 160 is spaced apart from head 16, and is in fluid communication with supply 42 via a conduit 162 and with head 16 via a conduit 164. Also known, are configurations in which the pre-heater is mounted on the printing head. Conduit 162 is provided with a pump 170 that is controlled by controller 20 (or 152) and is configured for generating a flow of building material from supply 42 into pre-heater 160 and also from pre-heater 160 into head 16.

The present inventors found that when the building material dispensed by a particular head is to be replaced by another building material, all the material that exists in the pre-heater, reservoirs and fluid paths to the head in question has to be discarded, for example, by operating the printing head to dispense the material outside the printing area in a process also known as 'purging'. Use of a pre-heater and reservoir therefore significantly increase the amount of waste that is generated by the system and increase the overall printing time, if purging events are performed while an object is being printed.

Conventional systems may also comprise a fluid retraction loop 166 for controllably allowing building material to retract from conduit 164 and from head 16 back into pre-heater element 160 or supply 42. The fluid retraction loop 166 typically comprises a pump 168 for controlling the flow within loop 166. Some systems also comprise a reservoir 172 for holding the heated material before it enters the printing head manifolds for dispensing. The present inventors found that this solution is less than optimal, since the retraction process increases overall purging time and the amount of waste generated.

In a search for a solution for the above problem, the inventor found that there are many situations in which a pre-heater is unnecessary. In particular, a pre-heater is unnecessary in systems that dispense materials at low working temperatures. Such systems include systems having dispensing heads that are capable of dispensing high viscosity material formulations, in which it is not required to reduce the viscosity by heating. Another example is systems that are designed for dispensing low viscosity material formulations which are jettable at low working temperatures (e.g., lower than 50° C.). In both the above cases, it is not necessary to use a pre-heater to ensure a continuous supply of preheated formulations, since the formulations are typically close to or at their working temperature while exiting the supply cartridge. A reservoir dedicated for storing preheated formulation also becomes unnecessary. Thus, having less component parts, in addition to energy and time saving as well as reduction of waste material generated by the system, the solution found by the inventor also provides a system which may be smaller in size, less expensive and more environmentally friendly. Additionally, a system where less material is used between the cartridge and the printing head allows a rapid switching from one material to another in a specific channel of a printing head. For instance, switching can be done between passes/scans of the printing block or even during the pass. This may be particularly useful when the printing system comprises a limited number of printing channels but it is desired to manufacture an object using a large number of materials. In a specific embodiment, a plurality of materials can be dispensed by a printing head having a single channel.

Figure 5A:
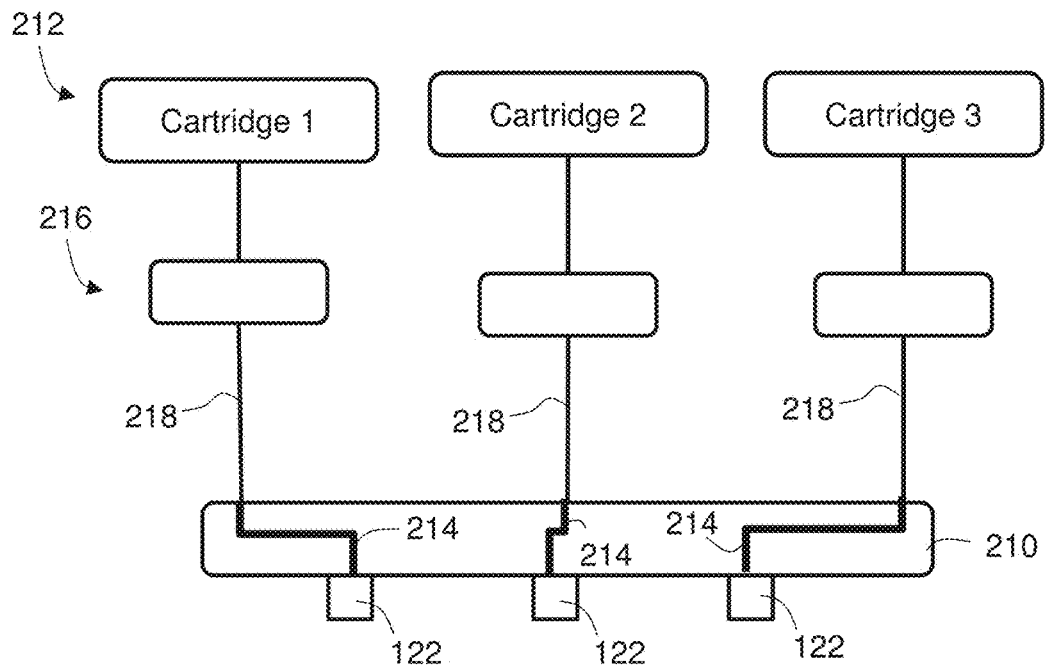
FIGS. 5A and 5B are schematic illustrations of printing systems according to some embodiments of the invention.
Figure 5B:
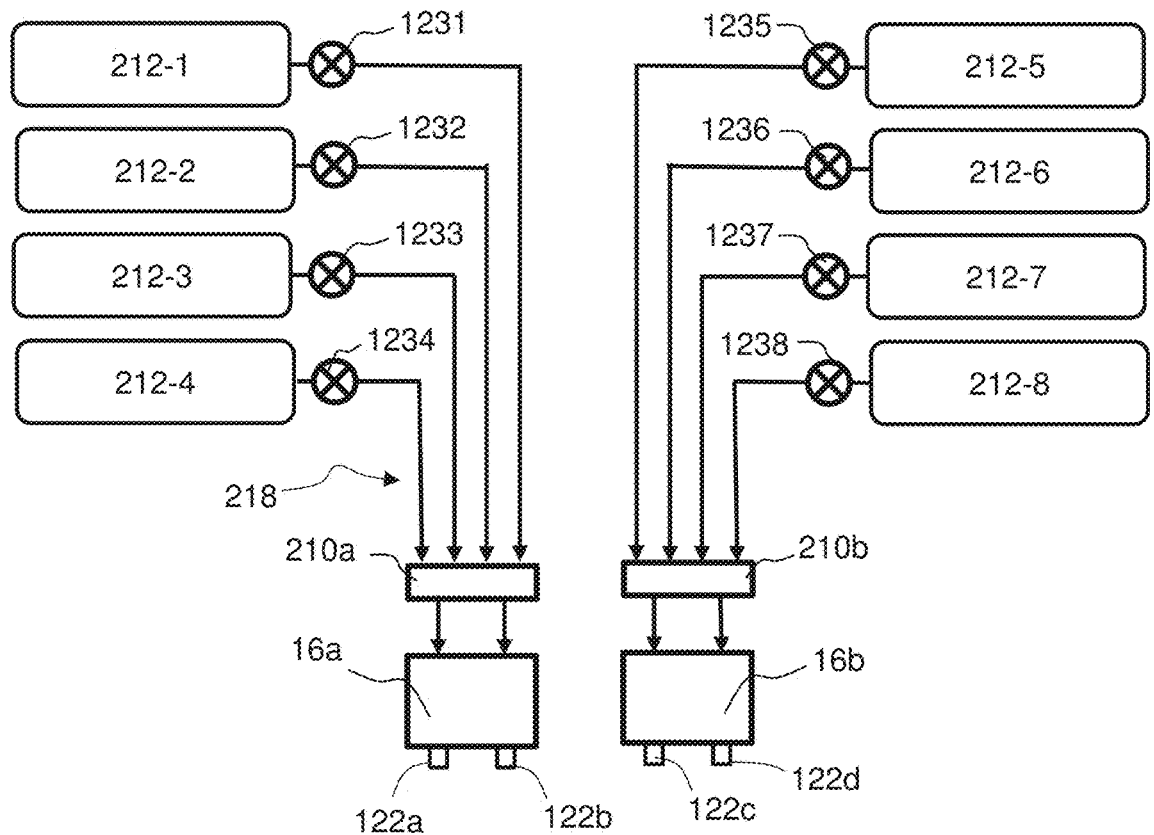

Schematic illustrations of a building material feeding scheme suitable according to some embodiments of the present invention are illustrated in FIGS. 5A and 5B. The feeding scheme is suitable for any of systems 10 and 110 described above.

FIG. 5A shows a manifold 210 that includes a plurality of channels 214 distributing building materials from a plurality of cartridges 212 to a respective plurality of arrays 122 of nozzles. Shown in FIG. 5A are three cartridges 212 and three arrays 122 of nozzles, but it is to be understood that any number of cartridges and any number of arrays, including a single cartridge and a single array is contemplated. The manifold 210 that is illustrated in FIG. 5A is of the 3-to-3 types (three inlet ports and three outlet ports), but any other type of manifold can be employed. Typically, the number of inlet ports of manifold 210 equals the number of cartridges, and the number of outlet ports of manifold 210 equals the number of arrays of nozzles. FIG. 5A illustrates an embodiment in which the number of cartridges is the same as the number of arrays of nozzles (three, in this example). Preferred embodiments in which the number of cartridges is not the same as the number of arrays of nozzles (e.g., more cartridges than arrays of nozzles) are described below with reference to FIG. 5B.

Two, three, or more of arrays 122 can be in an orifice plate of the same dispensing head (e.g., as illustrated schematically in FIG. 2B). Alternatively, each of arrays 122 can be in an orifice plate of a different dispensing head (e.g., as illustrated schematically in FIG. 2A). Still alternatively, two, three, or more of arrays 122 can be in an orifice plate of one of the dispensing heads of (e.g., as illustrated schematically in FIG. 2B). Alternatively, each of arrays 122 can be in an orifice plate of a different dispensing head (e.g., as illustrated schematically in FIG. 2A).

Each array 122 is in fluid communication with a different channel 214 of manifold 210. Flow of building material from a particular cartridge 212 via the respective channel 214 of the cartridge 212 and into the respective nozzle array 122 can be controlled by a flow controlling device 216 such as, but not limited to, a valve and/or a pump. In embodiments in which the flow is established by gravity, it is sufficient for flow controlling device 216 to be embodied as a valve. In embodiments in which the flow cannot be established by gravity or by gravity alone, flow controlling device 216 includes a pump. For each cartridge 212, the flow is preferably via a conduit 218 that establishes a direct fluid communication between the respective cartridge 212 and the respective channel 214 of manifold 210, without passing through an additional component that holds or maintains building material therein, such as a pre-heater or a reservoir. This is unlike conventional systems (e.g., the system shown in FIG. 4), in which there is no direct flow of building material from the supply 42 to the head 16, since material first flows into the pre-heater 160.

In preferred embodiments, the AM system is devoid of any dispensing head which is not directly connected to one or more cartridges.

FIG. 5B illustrates a building material feeding scheme in which different dispensing heads are fed by different sets of cartridges via different manifolds. Shown in FIG. 5B is a block of two dispensing heads 16a and 16b, each being arranged to be fed by four cartridges, but the present embodiments contemplate any number of heads.

According to some embodiments of the present invention, for at least one of the heads, the number of cartridges that are connected to the head is larger than the number of nozzle arrays of this head. In these embodiments the manifold that feeds this head is of the M-N type, wherein M>N, where M is the number of cartridges that feeds the head and N is the number of nozzle arrays of the head. As will be exemplified below, this allows the system to fabricate objects from many different types of materials. Specifically, the number of materials from which an object is fabricated can be larger than the number of nozzle arrays that are in the system.

In the schematic illustration of FIG. 5B, which is not to be considered as limiting, head 16a comprises two nozzle arrays 122a and 122b, and is connected to four cartridges 212-1, 212-2, 212-3, 212-4, via a 4-2 manifold 210a, and head 16b comprises two nozzle arrays 122c and 122d, and is connected to four cartridges 212-5, 212-6, 212-7, 212-8, via a 4-2 manifold 210b. Material within each cartridge is delivered to the respective manifold via flow controlling devices 2161-2168.

In an example embodiment of the use of such a configuration, a first set of flow controlling devices is activated (devices 216-1, 216-4, 216-6, and 216-7, in the present example) is activated during a first pass of the block over a region of the tray (such as, but not limited to, a forward scan of system 110), so that, for example, array 122a dispenses material from cartridge 212-1, array 122b dispenses material from cartridge 212-4, array 122c dispenses material from cartridge 212-6 and array 122d prints material from cartridge 212-7. In a second pass of the block (such as, but not limited to, a reverse scan of system 110), a second set of flow controlling devices (e.g., devices 216-2, 216-5, and 216-7, in the present example) is activated, so that, for example, array 122a and array 122b both dispense material from cartridge 212-2, array 122c dispenses material from cartridge 212-5, and array 122d continues the dispensing material from cartridge 212-7 (as in the forward scan described above). Thus, this example demonstrates fabricating an object from six different materials (contained in cartridges 212-1, 212-2, 212-4, 212-5, 212-6, and 212-7), using four nozzle arrays.

Prior to the activation of the second set of flow controlling devices, a purging or 'spitting' protocol is employed, wherein remnant material(s) from the first flow of materials in the manifolds, and optionally in the conduits is dispensed, to empty the respective manifold channel. Such purging can be made in regions that are not significant for the printed object (e.g., within internal non-visible parts, such as, but not limited to, the core, of the object), or in regions of the object in which a support material would otherwise be dispensed, or outside the printing area (e.g., at a servicing station, at an empty location of the tray). The advantage of the configuration illustrated in FIGS. 5A-B is that due to the very low amount of material that exists in the conduits 218, the manifolds 212 and the nozzles 122, the amount of building material waste is minimal, and in any event significantly less that the waste in conventional systems employing pre-heater(s).

The dispensing heads that can be used in the schemes shown in FIGS. 5A and 5B, include any three-dimensional printing heads that are designed and configured to dispense building material formulations at low working temperatures (e.g., lower than 50° C.).

For example, the printing head can be used to dispense a modeling material formulation characterized by a viscosity of no more than 50 cPs at 25° C. As a further example, the printing head can be used to dispense a modeling material formulation system, which comprises two or more curable materials and is characterized by a viscosity of no more than 50 cPs at 25° C. Preferably, the average molecular weight of the at least two curable materials is 500 grams/mol or less. A more detailed description of a formulation system that can be dispensed by the printing head of the present embodiments is described in the Example section that follows.

Another example includes printing heads that are capable of dispensing material formulations characterized by a higher viscosity at low working temperatures (e.g., lower than 50° C.), such as, but not limited to, printing heads that are capable of dispensing building material characterized by a viscosity of more than 30 cps, or more than 50 cPs or more than 55 cPs or more than 60 cPs or more than 65 cPs or more than 70 cPs, at about 25° C.

The direct connection between the cartridges and the manifold allows quick replacement or exchange of a material to be dispensed by a given printing head, by, discarding only the remnants of material within the manifold, conduit and/or pump. Since the amount of material in these components is typically low, the discarding can less time consuming and less wasteful hence being more environmentally friendly. Once the material remnants are discarded, a new cartridge holding a different building material can be connected to the conduit and the printing process can be resumed.

Discarding of building material from the manifold is preferably only from the channel that conveys the particular building material from a specific cartridge to the respective printing head nozzle array configured for its dispensing. This allows replacing a cartridge that is connected to the printing head, without replacing another cartridge that is connected to the same printing head.

As a representative Example, suppose that a first cartridge holding building material A and a second cartridge holding building material B are connected to the same manifold, which directs material A through a first channel to a first nozzle array and material B through a second channel to a second nozzle array. The head is operated and dispenses materials A and B. When it is desired to replace material B with material C, the head can discard material B in regions of the printing area that do not affect the object being printed (e.g., internal parts of the object, regions in which a support material would otherwise be dispensed), or be brought to a location outside the printing area (a service station), and the second nozzle array is activated to discard material B from the second channel, and respective conduit and pump. Material A can remain in the first channel. Thereafter, a third cartridge containing material C can be connected to the second channel, and the printing process can continue with materials A and C.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Suitable Formulation System

According to an aspect of some embodiments of the present invention there is provided a modeling material formulation system usable in additive manufacturing of a three-dimension object, which features a viscosity of no more than 50 cPs at 25° C., as defined herein.

According to some of any of the embodiments described herein, each formulation in the formulation system features a viscosity of no more than 40, or no more than 30, or no more than 25, or no more than 20, and even of less than 20, cPs, at 25° C.

According to some of any of the embodiments described herein, each formulation in the formulation system features a viscosity in the range of from about 8 to about 50, or from about 8 to about 40, or from about 8 to about 30, or from about 8 to about 25, or from about 8 to about 20, or from about 8 to about 15, cPs, at 25° C., including any intermediate value and subranges therebetween.

According to some of any of the embodiments described herein, each formulation in the formulation system features a viscosity in the range of from about 8 to about 50, or from about 8 to about 40, or from about 8 to about 30, or from about 8 to about 25, or from about 8 to about 20, or from about 8 to about 15, cPs, at 30° C., including any intermediate value and subranges therebetween.

According to some of any of the embodiments described herein, each formulation in the formulation system features a viscosity in the range of from about 8 to about 50, or from about 8 to about 40, or from about 8 to about 30, or from about 8 to about 25, or from about 8 to about 20, or from about 8 to about 15 cPs, at 25° C., including any intermediate value and subranges therebetween.

By "formulation system" it is meant a system that comprises one or more formulations, that is, one or more modeling material formulations, whereby each formulation in the system features the indicated viscosity. When the formulation system comprises two or more modeling material formulations it is a multi-formulation system, which comprises two or more modeling material formulations that can be used in combination to form a multi-material object.

When a formulation system comprises two or more formulations, each formulation can feature the same or different viscosity, yet each of the formulations features a viscosity as claimed.

According to some of any of the embodiments described herein, the formulation system is suitable for use, or is usable, in additive manufacturing processes, as described herein.

According to some of any of the embodiments described herein, the formulation system is suitable for use, or is usable, in 3D inkjet printing, as described herein.

According to some of any of the embodiments described herein, the formulation system is compatible with the jetting printing apparatus, particularly with the inkjet printing heads and arrays of nozzles therein, which dispense the formulations, as it features the required viscosity so as to be readily dispensed from the printing heads through the nozzle arrays, it features the required surface tension, and it is sufficiently stable (non-reactive) at the jetting conditions so as to avoid clogging of the dispensing (inkjet printing) heads and/or the nozzle arrays therein.

According to some of any of the embodiments described herein, the formulation system meets all the requirements of a 3D inkjet printing system, as recognized in the art and described herein.

According to some of any of the embodiments described herein, the formulation system comprises two or more curable materials, as defined herein.

According to some embodiments, each formulation in the formulation system comprises two or more curable materials as defined herein.

According to some of any of the embodiments described herein, the two or more curable materials can be monomeric curable materials, oligomeric curable materials or a mixture of monomeric and oligomeric curable materials, as defined herein.

According to some of any of the embodiments described herein, the two or more curable materials comprise a mixture of monomeric and oligomeric curable materials, as defined herein.

According to some of any of the embodiments described herein, a weight ratio between monomeric and oligomeric curable materials is at least 1:1, and is preferably higher, for example, is 1.1:1, or 1.2:1, or 1.3:1, or 1.5:1, or 1.6:1, or 1.7:1, or 1.8:1, or 1.9:1, or 2:1, and even higher.

According to some of any of the embodiments described herein, a weight ratio between monomeric and oligomeric curable materials ranges from 1:1 to 5:1, or from 1:1 to 4:1, or from 1.2:1 to 4:1, including any intermediate value and subranges therebetween.

According to some of any of the embodiments described herein, the two or more curable materials comprise a mixture of monomeric and oligomeric curable materials, and an amount of the monomeric curable materials is at least 50% by weight of the total weight of curable materials.

In some embodiments, an amount of monomeric curable materials is at least 60%, or at least 70%, or at least 80%, by weight, of the total weight of curable materials.

In exemplary embodiments, an amount of monomeric curable materials is from 80% to 90%, by weight, of the total weight of curable materials.

According to some of any of the embodiments described herein, an average molecular weight of the two or more curable materials is no more than 500 grams/mol.

By "average molecular weight" it is meant the sum of molecular weights of all the curable materials in a formulation, divided by the number of curable materials in the formulation. According to some of any of the embodiments described herein, an average molecular weight of the two or more curable materials ranges from 200 to 500 grams/mol, or from 250 to 500 grams/mol, or from 300 to 500 grams/mol, including any intermediate value and subranges therebetween.

According to some of any of the embodiments described herein, a relative average molecular weight of the two or more curable materials is no more than 500 grams/mol.

By "relative average molecular weight" it is meant the averaged molecular weight of the curable materials in the formulation or formulation system relative to their concentration in the formulation or formulation system, that is the sum of a molecular weight multiplied by a relative concentration in the formulation or formulation system, for each component, divided by the total concentration of curable materials in the formulation or formulation system, as follows:

$$(MW \times \% \text{ wt. of } A + MW \text{ } a\% \text{ wt. of } B)/\text{total } \% \text{ wt. of curable materials}.$$

According to some of any of the embodiments described herein, a relative average molecular weight of the two or more curable materials ranges from 200 to 500 grams/mol, or from 250 to 500 grams/mol, or from 300 to 500 grams/mol, including any intermediate value and subranges therebetween. As discussed hereinabove, curable materials included in the one or more formulations in the formulation system of the present embodiments can be selected so as to provide a wide range of hardened materials, featuring variable properties such as elasticity, hardness, stiffness, and thermal stability, and various structures, including shelled and non-shelled structures.

The formulation system as described herein can comprise curable materials as described herein which can provide, in the same object, for example, portions made of rigid materials, portions made of elastomeric material, portions made of materials with high HDT (thermal stability) and portions made of materials with high Impact resistance, by selecting modeling formulations that provide materials with the desired properties at selected region(s) of the object, while utilizing the low viscosity of all these formulations at low temperatures.

According to some of any of the embodiments described herein, the formulation system comprises at least one formulation which, when hardened, provides a non-elastomeric, rigid material.

According to some of any of the embodiments described herein, the formulation system comprises at least one formulation which, when hardened, provides an elastomeric material.

According to some of any of the embodiments described herein, the formulation system comprises at least two formulations which are suitable, when used together, for forming shelled objects featuring a core region and at least one envelope region which at least partially surrounds the core region. The two formulations can be selected so as to feature properties as previously described for shelled objects. For example, in some embodiments, such a formulation system comprises a first formulation which, when hardened, provides a material featuring a high HDT (e.g., higher than 60° C.), and a second formulation which, when hardened, provides a material featuring high Impact resistance (e.g., higher than 35 J/m). In some embodiments, such a formulation system comprises two formulations which provide materials featuring a certain ratio of the elastic moduli thereof.

Herein throughout, the phrases "rubber", "rubbery materials", "elastomeric materials" and "elastomers" are used interchangeably to describe materials featuring characteristics of elastomers. The phrase "rubbery-like material" or "rubber-like material" is used to describe materials featuring characteristics of rubbers, prepared by additive manufacturing (e.g., 3D inkjet printing) rather than conventional processes that involve vulcanization of thermoplastic polymers.

The term "rubbery-like material" is also referred to herein interchangeably as "elastomeric material".

Elastomers, or rubbers, are flexible materials that are characterized by low Tg (e.g., lower than 10° C., preferably lower than 0° C. and even lower than −10° C.).

Herein, "Tg" refers to glass transition temperature defined as the location of the local maximum of the E" curve, where E" is the loss modulus of the material as a function of the temperature. Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. The lowest temperature of the Tg range is referred to herein as Tg (low) and the highest temperature of the Tg range is referred to herein as Tg (high).

In any of the embodiments described herein, the term "temperature higher than Tg" means a temperature that is higher than the Tg temperature, or, more preferably a temperature that is higher than Tg (high).

The following describes some of the properties characterizing rubbery materials, as used herein and in the art.

Shore A Hardness, which is also referred to as Shore hardness or simply as hardness, describes a material's resistance to permanent indentation, defined by type A durometer scale. Shore hardness is typically determined according to ASTM D2240. Elastomeric materials are typically characterized by low Shore Hardness, e.g., lower than 100.

Elastic Modulus, which is also referred to as Modulus of Elasticity or as Young's Modulus, or as Tensile modulus, or "E", describes a material's resistance to elastic deformation when a force is applied, or, in other words, as the tendency of an object to deform along an axis when opposing forces are applied along that axis. Elastic modulus is typically measured by a tensile test (e.g., according to ASTM D 624) and is determined by the linear slope of a Stress-Strain curve in the elastic deformation region, wherein Stress is the force causing the deformation divided by the area to which the force is applied and Strain is the ratio of the change in some length parameter caused by the deformation to the original value of the length parameter. The stress is proportional to the tensile force on the material and the strain is proportional to its length. The Elastic Modulus of elastomers is typically low, e.g., lower than 1000 MPa.

Elongation at failure, which is also referred to herein and in the art as elongation at break, $\varepsilon_R$, is determined as the maximal strain (elongation) which can occur (upon application of tensile stress equal to the ultimate tensile strength) before failure of the tested material occurs (e.g., as rupture or necking).

Elongation is the extension of a uniform section of a material, expressed as percent of the original length as follows:

$$\text{Elongation \%} = \frac{\text{Final length} - \text{Original length}}{\text{Original length}} \times 100.$$

Elongation is typically determined according to ASTM D412.

Elongation of elastomers is typically high, e.g., higher than 50% or higher than 100% or higher than 200%. Recovery is determined by releasing the tensile stress after subjecting the tested material as the ratio of the decrease in length to a prior strain after a material (e.g., elastic layer) is subjected to a prior strain which is almost equal to the elongation at failure (optionally about 90% of the elongation at failure, optionally about 95% of the elongation at failure, optionally about 98% of the elongation at failure, optionally about 99% of the elongation at failure, wherein the elongation at failure can be determined using an equivalent sample). Thus, for example, a material extended to an elongation at failure which is 200%, and which upon release of tensile stress returns to a state characterized by a strain of 20% relative to the original length, would be characterized as having a recovery of 90% (i.e., 200%-20% divided by 200%). The recovery of elastomers is typically high, e.g., higher than 50%, or higher than 70% or higher.

Tensile Strength describes a material's resistance to tension, or, in other words, its capacity to withstand loads tending to elongate, and is defined as the maximum stress in MPa, applied during stretching of an elastomeric composite before its rupture. Tensile strength is typically measured by a tensile test (e.g., according to ASTM D 624) and is determined as the highest point of a Stress-Strain curve, as described herein and in the art.

Z Tensile elongation is the elongation measured as described herein upon printing in Z direction.

Tear Resistance (TR), which is also referred to herein and in the art as "Tear Strength" describes the maximum force required to tear a material, expressed in N per mm, whereby the force acts substantially parallel to the major axis of the sample. Tear Resistance can be measured by the ASTM D 412 method. ASTM D 624 can be used to measure the resistance to the formation of a tear (tear initiation) and the resistance to the expansion of a tear (tear propagation). Typically, a sample is held between two holders and a uniform pulling force is applied until deformation occurs. Tear Resistance is then calculated by dividing the force applied by the thickness of the material. Materials with low Tear Resistance tend to have poor resistance to abrasion.

Tear Resistance under constant elongation describes the time required for a specimen to tear when subjected to constant elongation (lower than elongation at break). This value is determined, for example, in an "O-ring" test as described in the Examples section that follows.

Herein and in the art, a material is defined as an elastomer if it features one or more of the above-mentioned properties within a range that characterize elastomeric materials.

Non-elastomeric materials, as used herein, refer to materials that do not exhibit elastomeric properties, and are, for example, rigid materials, characterized by Tg above room temperature and/or high Shore Hardness, and/or high Elastic Modulus, and/or low elongation.

Non-Elastomeric Materials:

According to some of any of the embodiments described herein, at least one formulation in the formulation system of the present embodiments provides, when hardened, a non-elastomeric (rigid) material.

Such formulations are suitable for use in additive manufacturing of an object which comprises, in at least a portion thereof, a non-elastomeric, rigid, material.

In some of any of the embodiments described herein, formulations which provide non-elastomeric materials comprise a mixture of hydrophilic and hydrophobic materials which feature properties as indicated in the respective embodiments herein.

Herein throughout, the term "hydrophilic" describes a physical property of a compound or a portion of a compound (e.g., a chemical group in a compound) which accounts for transient formation of bond(s) with water molecules, typically through hydrogen bonding.

A hydrophilic compound or portion of a compound (e.g., a chemical group in a compound) is one that is typically charge-polarized and capable of hydrogen bonding.

Hydrophilic compounds or groups typically include one or more electron-donating heteroatoms which form strong hydrogen bonds with water molecules. Such heteroatoms include, but are not limited to, oxygen and nitrogen. Preferably, a ratio of the number of carbon atoms to a number of heteroatoms in a hydrophilic compounds or groups is 10:1 or lower, and can be, for example, 8:1, more preferably 7:1, 6:1, 5:1 or 4:1, or lower. It is to be noted that hydrophilicity of compounds and groups may result also from a ratio between hydrophobic and hydrophilic moieties in the compound or chemical group, and does not depend solely on the above-indicated ratio.

Hydrophilic compounds dissolve more readily in water than in oil or other hydrophobic solvents. Hydrophilic compounds can be determined by, for example, as having Log P lower than 0.5, when Log P is determined in octanol and water phases, at a temperature lower than 50° C., or lower than 40° C., or lower than 35° C. or lower than 30° C., e.g., at 25° C.

Alternatively, hydrophilic compounds can be determined by, for example, the Hansen parameters, as having relative energy distance (RED) higher than 1, when calculated for interaction with water as a solvent, at a temperature lower than 50° C., or lower than 40° C., or lower than 35° C. or lower than 30° C., e.g., at 25° C.

A hydrophilic compound can have one or more hydrophilic groups that render the compound hydrophilic. Such groups are typically polar groups, comprising one or more electron-donating heteroatoms such as oxygen and nitrogen. The hydrophilic group can be, for example, one or more substituent(s) of a monomeric mono-functional curable material or two or more substituents or interrupting groups of an oligomeric mono-functional curable material. The hydrophilic group can be, for example, one or more substituent(s) of a monomeric multi-functional curable material or one or more substituents or interrupting groups of a linking moiety of a monomeric multi-functional curable moiety. The hydrophilic group can be, for example, two or more substituents or interrupting groups of an oligomeric linking moiety in oligomeric multi-functional curable material.

Exemplary hydrophilic groups include, but are not limited to, an electron-donating heteroatom, a carboxylate, a thiocarboxylate, oxo (=O), a linear amide, hydroxy, a (C1-4) alkoxy, an (C1-4) alcohol, a heteroalicyclic (e.g., having a ratio of carbon atoms to heteroatoms as defined herein), a cyclic carboxylate such as lactone, a cyclic amide such as lactam, a carbamate, a thiocarbamate, a cyanurate, an isocyanurate, a thiocyanurate, urea, thiourea, an alkylene glycol (e.g., ethylene glycol or propylene glycol), and a hydrophilic polymeric or oligomeric moiety, as these terms are defined hereinunder, and any combinations thereof (e.g., a hydrophilic group that comprises two or more of the indicated hydrophilic groups).

In some embodiments, the hydrophilic group is, or comprises, an electron donating heteroatom, a carboxylate, a heteroalicyclic, an alkylene glycol and/or a hydrophilic oligomeric moiety.

A hydrophilic polymeric or oligomeric moiety, as used herein, comprises a polymeric chain which comprises hydrophilic groups as defined herein. The hydrophilic groups can be heteroatoms within the backbone chain of the polymeric moiety, as, for example, in poly(alkylene glycols) or hydrophilic pendant groups. A polymeric or oligomeric moiety, according to some embodiments of the present invention, preferably has from 10 to 40 repeating backbone units, more preferably from 10 to 20 repeating backbone units.

A hydrophilic mono-functional curable material according to some embodiments of the present invention can be a vinyl-containing compound represented by Formula I:

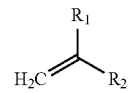

Formula I wherein at least one of $R_1$ and $R_2$ is and/or comprises a hydrophilic group, as defined herein.

The (=CH$_2$) group in Formula I represents a polymerizable group, and is typically a UV-curable group, such that the material is a UV-curable material.

For example, $R_1$ is a hydrophilic group as defined herein and $R_2$ is a non-hydrophilic group, for example, hydrogen, C(1-4) alkyl, C(1-4) alkoxy, or any other substituent, as long as the compound is hydrophilic, as defined herein.

In some embodiments, $R_1$ is a carboxylate, and the compound is a mono-functional acrylate monomer. In some of these embodiments, $R_2$ is methyl, and the compound is mono-functional methacrylate monomer. In other embodiments, $R_2$ is a hydrophilic substituent, namely, a substituent which is, or which comprises, a hydrophilic group as described herein.

In some of any of these embodiments, the carboxylate group, —C(=O)—OR', comprises R' which is a hydrophilic group. Exemplary R' groups include, but are not limited to, heteroalicyclic groups (having a ratio of 5:1 or lower of carbon atoms to electron-donating heteroatoms, such as morpholine, tetrahydrofurane, oxalidine, and the likes), hydroxyl, C(1-4)alkoxy, thiol, alkylene glycol or a polymeric or oligomeric moiety, as described herein. An exemplary monomeric mono-functional acrylate is acryloyl morpholine (ACMO).

In some embodiments, $R_1$ is amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, for example, a hydrophilic oligomeric moiety, as defined herein, the mono-functional curable compound of Formula I is an exemplary oligomeric mono-functional curable material. Otherwise, it is an exemplary monomeric mono-functional curable material.

Exemplary oligomeric mono-functional curable materials include, but are not limited to, a mono-(meth)acrylated urethane oligomer derivative of polyethylene glycol, a mono-(meth)acrylated polyol oligomer, a mono-(meth)acrylated oligomer having hydrophilic substituents, and a mono-(meth)acrylated polyethylene glycol (e.g., methoxypolyethylene glycol). (Meth)acrylated means that the oligomer or polymer comprises an acrylate or methacrylate functional group.

In some embodiments, $R_1$ is a poly(alkylene glycol), as defined herein.

A hydrophilic multi-functional curable material according to some embodiments of the present invention can be represented by Formula II:

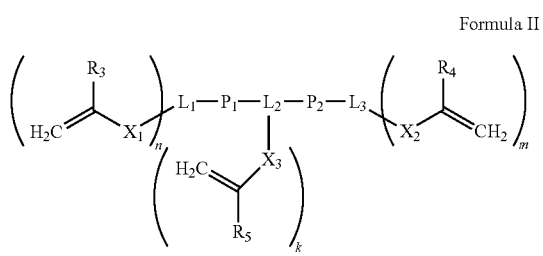

Formula II wherein:
each of $R_3$, $R_4$ and $R_5$ is independently hydrogen, C(1-4) alkyl, or a hydrophilic group, as defined herein;
each of $L_1$, $L_2$ and $L_3$ is independently a linking moiety or absent;
each of $P_1$ and $P_2$ is independently a hydrophilic group as defined herein or absent;
each of $X_1$, $X_2$ and $X_3$ is independently C(1-4)alkyl, or a hydrophilic group, as defined herein, or absent; and
each of n, m and k is 0, 1, 2, 3 or 4,
provided that n+m+k is at least 2, and provided that at least one of $R_3$, $R_4$, $R_5$, $X_1$, $X_2$, $X_3$ $P_1$ and $P_2$ is a hydrophilic group, as defined herein.

Multi-functional curable materials of Formula II in which one, two or all of $X_1$, $X_2$ and $X_3$, when present, is oxo, are multi-functional acrylates, which can be further substituted by a hydrophilic group, as described hereinabove. When one or more of $R_3$, $R_4$ and $R_5$, when present, is methyl, the curable materials are multi-functional methacrylates.

Multi-functional curable materials in which one, two or all of $X_1$, $X_2$ and $X_3$, when present, is oxo, can include a combination of acrylate and methacrylate functional moieties.

In some embodiments, the acrylate or methacrylate multifunctional curable material is monomeric, such that none of $P_1$ and $P_2$ is a polymeric or oligomeric moiety. In some of these embodiments, one or both of $P_1$ and $P_2$ is a hydrophilic group as described herein, for example, an alkylene glycol, or any other hydrophilic linking group, or a short chain (e.g., of 1-6 carbon atoms), substituted or unsubstituted hydrocarbon moiety, as defined herein.

In some embodiments, one or both of $P_1$ and $P_2$ is a polymeric or oligomeric moiety as defined herein, and the curable compound is an oligomeric multi-functional curable material, for example, an oligomeric multi-functional acrylate or methacrylate, as described herein for $X_1$, $X_2$ and/or $X_3$. If both $P_1$ and $P_2$ are present, $L_2$ can be, for example, a linking moiety such as a hydrocarbon, comprising alkyl, cycloalkyl, aryl and any combination thereof. Exemplary such curable materials include ethoxylated or methoxylated polyethylene glycol diacrylate, and ethoxylated bisphenol A diacrylate.

Other non-limiting examples include polyethylene glycol diacrylate, polyethylene glycol dimethacrylate, polyethylene glycol-polyethylene glycol urethane diacrylate, and a partially acrylated polyol oligomer.

In some embodiments, one or more of $P_1$ and $P_2$ is, or comprises, a poly(alkylene glycol) moiety, as defined herein.

In some of any of the embodiments of an acrylate or methacrylate multifunctional curable material of Formula II, one or more of $R_3$, $R_4$ and $R_5$ is a hydrophilic group as described, for example, for $R_1$ and $R_2$ in Formula I, herein. In these embodiments, $P_1$ and/or $P_2$ can be present or absent, and can be, or comprise, a hydrophilic group or not, as long as the material is hydrophilic, as defined herein.

Alternatively, one, two or all of $X_1$, $X_2$ and $X_3$, when present, can be —O—, such that at least one functional moiety in the multi-functional curable material is vinyl ether.

In some embodiments, n and m are each 1, k is 0, $X_1$ is O, $X_2$ is absent, and the compound is a vinyl ether, which can be substituted or not. In some of these embodiments, $L_1$, $L_2$, $L_3$, $P_1$ and $P_2$ are absent, and the compound is a monomeric vinyl ether. Examples of monomeric vinyl ethers include ethyl vinyl ether, propyl vinyl ether, isobutyl vinyl ether, cyclohexyl vinyl ether, 2-ethylhexyl vinyl ether, butyl vinyl ether, ethylene glycol monovinyl ether, di(ethylene glycol) divinyl ether, butane diol divinyl ether, hexane diol divinyl ether, cyclohexane dimethanol monovinyl ether and the like.

In some embodiments, $P_1$ and $P_2$ are absent, and one of $L_1$ and $L_2$ is an alkylene chain substituted by one or more hydrophilic groups. An exemplary such curable compound is 1,4-cyclohexane dimethanol divinyl ether.

In some embodiments, one or more of $P_1$ and $P_2$ is a hydrophilic polymeric or oligomeric moiety, as defined herein. In some embodiments, one or more of $P_1$ and $P_2$ is, or comprises, a poly(alkylene glycol) moiety, as defined herein. In some embodiments the polymeric moiety is substituted by one or more vinyl ether substituents.

In some of any of the embodiments related to Formula II, one or more of the substituents of the polymerizable group, $R_3$, $R_4$ and $R_5$, can be a hydrophilic group as described for $R_1$ and $R_2$ in Formula I herein.

In some of any of the embodiments related to Formula II, when P1 and P2 is a polymeric or oligomeric moiety, this moiety can comprise hydrophilic heteroatoms as defined herein, within the backbone chain or the backbone chain can be substituted by hydrophilic groups, as described herein.

According to some of any of the embodiments described herein, each of the hydrophilic curable materials is a monomeric or oligomeric, mono-functional or multi-functional, acrylate or methacrylate, for example, as described herein in any of the respective embodiments.

According to some of any of the embodiments described herein, a hydrophilic curable material as described herein is water-soluble or water-miscible.

According to some of any of the embodiments described herein, a hydrophilic curable material as described herein is also referred to herein as a polar curable material.

A "hydrophobic" curable material, as described herein, refers to materials which are characterized by Log P, when measured for water and octanol, higher than 1, and preferably higher.

Hydrophobic curable materials can be represented by Formulae I and II as presented herein, wherein none or only a minority of the groups is a hydrophilic group.

Hydrophobic curable materials include, as non-limiting examples, monofunctional acrylates or methacrylates, in which R' in Formula I is R' is an alkyl, cycloalkyl, alkaryl, aryl, and the like.

Hydrophobic curable materials include, as non-limiting examples, multifunctional acrylates or methacrylates, in which the majority of the variables in Formula II is R' is or comprises an alkyl, cycloalkyl, alkaryl, aryl, and the like.

Exemplary multi-functional curable materials that are usable in the context of these embodiments include diacrylates such as aliphatic urethane diacrylate oligomer and/or monomeric diacrylates, preferably short chain diacrylates such as, but not limited to, isobornyl diacrylate.

Exemplary multi-functional curable materials can have Formula II as described herein, yet, $R_3$, $R_4$, $R_5$, $P_1$ and $P_2$, when present, are non-hydrophilic groups, or, together result in a non-hydrophilic compound.

Exemplary monofunctional curable materials include, as non-limiting examples, isobornyl acrylate or isobornyl methacrylate.

Hydrophobic curable materials are typically water-insoluble or water-immiscible.

Hydrophobic curable materials are also referred to herein as apolar curable materials.

Hydrophobic compounds dissolve more readily in oil or other hydrophobic solvents than in water. Hydrophobic compounds can be determined by, for example, as having Log P higher than 1, when Log P is determined in octanol and water phases, at a temperature lower than 50° C., or lower than 40° C., or lower than 35° C. or lower than 30° C., e.g., at 25° C.

Alternatively, hydrophobic compounds can be determined by, for example, the Hansen parameters, as having relative energy distance (RED) lower than 1, when calculated for interaction with water as a solvent, at a temperature lower than 50, or lower than 40° C., or lower than 35° C. or lower than 30° C., e.g., at 25° C. In some of any of these embodiments, a formulation which provides, when hardened, a non-elastomeric, rigid, material, comprises:

at least one hydrophobic curable material which provides, when hardened, a material featuring Tg higher than 80° C.; and at least one hydrophilic curable material which provides, when hardened, a material featuring Tg higher than 80° C.

Herein throughout, whenever a property of a curable material is mentioned for a hardened material thereof, the hardened material is made solely from the hardened curable material.

In some of any of the embodiments described herein for non-elastomeric materials, a total amount of the at least one hydrophobic curable material which provides, when hardened, a material featuring Tg higher than 80° C., is from 25 to 60 weight percents, or from 28 to 55 weight percents, of the total weight of the formulation comprising same, including any intermediate value and subranges therebetween.

In some of any of the embodiments described herein, the hydrophobic curable material which provides, when hardened, a material featuring Tg higher than 80° C. comprises a mixture of a mono-functional curable material and a multi-functional curable material, and in some of these embodiments the multi-functional curable material is a di-functional curable material, as described herein in any of the respective embodiments and any combination thereof.

In some embodiments, a concentration of the hydrophobic monomeric mono-functional curable material(s) ranges from 28 to 60 weight percents, and in some embodiments it ranges from 40 to 50 weight percents, of the total weight of the formulation comprising same, including any intermediate value and subranges therebetween.

In some embodiments, a concentration of the hydrophobic multi-functional (e.g., di-functional) curable material ranges from 0 to 25 weight percents, and in some embodiments, it ranges from 20 to 25 weight percents, of the total weight of the formulation comprising same, including any intermediate value and subranges therebetween.

In some of any of the embodiments described herein a total amount of the at least one hydrophilic curable material which provides, when hardened, a material featuring Tg higher than 80° C., is from 15 to 35 weight percents of the total weight of the at least one formulation.

In some of any of the embodiments described herein, the hydrophilic curable material which provides, when hardened, a material featuring Tg higher than 80° C. comprises a mixture of a mono-functional curable material and a multi-functional curable material, and in some of these embodiments the multi-functional curable material is a di-functional curable material, as described herein in any of the respective embodiments and any combination thereof.

In some of these embodiments, an amount of the at least one hydrophilic monofunctional curable material which provides, when hardened, a material featuring Tg higher than 80° C., ranges from 15 to 30 weight percents of the total weight of the formulation comprising same, including any intermediate value and subranges therebetween.

In some of these embodiments, an amount of the at least one hydrophilic multifunctional curable material which provides, when hardened, a material featuring Tg higher than 80° C. ranges from 0 to 5 weight percents of the total weight of the at least one formulation.

In some of any of the embodiments described herein, a formulation that provides, when hardened, a non-elastomeric, rigid material, further comprises at least one of:

at least one hydrophobic curable material which provides, when hardened, a material featuring Tg lower than 25° C.;

at least one hydrophilic curable material which provides, when hardened, a material featuring Tg lower than 25° C.; and at least one hydrophilic curable material which provides, when hardened, a material featuring Tg that ranges from 25° C. to 50° C.

In some of any of these embodiments, a total amount of the at least one hydrophobic curable material which provides, when hardened, a material featuring Tg lower than 25° C. ranges from 0 to 15 of the total weight of the formulation comprising same, including any intermediate value and subranges therebetween.

In some of these embodiments, the at least one hydrophobic curable material which provides, when hardened, a material featuring Tg lower than 25° C. comprises at least one hydrophobic monofunctional curable material, and/or at least one hydrophobic multifunctional (e.g., difunctional) curable material, each independently provides the indicated Tg when hardened.

In some of these embodiments, an amount of the at least one hydrophobic monofunctional curable material which provides, when hardened, a material featuring Tg lower than 25° C. ranges from 0 to 5 weight percents of the total weight of the formulation comprising same, including any intermediate value and subranges therebetween.

In some of these embodiments, an amount of the at least one hydrophobic multifunctional curable material which provides, when hardened, a material featuring Tg lower than 25° C. ranges from 0 to 10 weight percents of the total weight of the formulation comprising same, including any intermediate value and subranges therebetween.

In some of any of the embodiments described herein, a total amount of the at least one hydrophilic curable material which provides, when hardened, a material featuring Tg lower than 25° C. ranges from 0 to 30 of the total weight of the formulation comprising same, including any intermediate value and subranges therebetween.

In some of these embodiments, the at least one hydrophilic curable material which provides, when hardened, a material featuring Tg lower than 25° C. comprises at least one hydrophilic monofunctional curable material and/or at least one hydrophilic multifunctional (e.g., di-functional) curable material, each independently provides, when hardened, the indicated Tg.

In some of these embodiments, an amount of the at least one hydrophilic monofunctional curable material which provides, when hardened, a material featuring Tg lower than 25° C. ranges from 0 to 5 weight percents of the total weight of the formulation comprising same, including any intermediate value and subranges therebetween.

In some of these embodiments, an amount of the at least one multifunctional curable material ranges from 0 to 30 weight percents of the total weight of the formulation comprising same, including any intermediate value and subranges therebetween.

In some of any of the embodiments described herein, a total amount of the at least one hydrophilic curable material which provides, when hardened, a material featuring Tg that ranges from 25° C. to 80° C. ranges from 0 to 15 of the total weight of the formulation comprising same, including any intermediate value and subranges therebetween.

In some of any of the embodiments described herein, a total amount of hydrophobic curable materials in a formulation that provides a non-elastomeric, rigid, material as described herein, ranges from 35-75 weight percents of the total weight of the formulation comprising same, including any intermediate value and subranges therebetween. In some of any of the embodiments described herein, a total amount of hydrophilic curable materials in a formulation that provides a non-elastomeric, rigid, material, ranges from 20-60 weight percents of the total weight of the formulation comprising same, including any intermediate value and subranges therebetween.

In some of any of the embodiments described herein, a formulation that provides a non-elastomeric, rigid, material, further comprises a curable material that features a viscosity at room temperature of no more than 15 centipoises, or even lower. Such materials are also referred to herein as "reactive diluents". Exemplary such materials include low molecular weight monofunctional and multifunctional divinyl ethers (e.g., DVE2, DVE3), and low molecular weight monofunctional and multifunctional (meth)acrylates (e.g., featuring short alkyls or short alkylene chains).

In some of these embodiments, an amount the curable material ranges from 0 to 7 weight percents of the total weight of the formulation comprising same.

A formulation system that comprises one or more of a formulation as described in the foregoing embodiments can be used in additive manufacturing such as 3D inkjet printing in a single jetting mode, when the formulation system comprises one modeling material formulation, or in a multi material mode (PolyJet), including DM mode, when the formulation system comprises two or more modeling material formulations.

When two or more formulations are used, the formulations can differ from another, for example, by different reactive (curable components) and/or by different non-reactive (non-curable) components, as described hereinafter, as long as it features the indicated viscosity and comprises curable materials as described in any of the respective embodiments.

The following describes exemplary, non-limiting, embodiments of formulations usable in a formulation system that provides non-shelled three-dimensional objects, made of a single modeling material or of multi-materials, including digital materials.

In exemplary formulation systems according to these embodiments, a total amount of the at least one hydrophobic curable material which provides, when hardened, a material featuring Tg higher than 80° C., is from 50 to 60 weight percents of the total weight of the formulation comprising same, including any intermediate values and subranges therebetween.

In some of these embodiments, the at least one hydrophobic curable material which provides, when hardened, a material featuring Tg higher than 80° C. comprises at least one monofunctional curable material and/or at least one multifunctional curable material, as described herein in the respective embodiments.

In some of these embodiments, an amount of the at least one monofunctional curable material ranges from 25 to 60 weight percents of the total weight of the formulation comprising same, including any intermediate values and subranges therebetween.

In some of these embodiments, an amount of the at least one multifunctional curable material ranges from 0 to 25 weight percents of the total weight of the formulation comprising same, including any intermediate values and subranges therebetween.

In exemplary embodiments, the at least one hydrophobic curable material which provides, when hardened, a material featuring Tg higher than 80° C. comprises only a monofunctional curable material, at a concentration of from 50 to 60 weight percents of the total weight of the formulation comprising same, including any intermediate values and subranges therebetween.

In exemplary embodiments, the at least one hydrophobic curable material which provides, when hardened, a material featuring Tg higher than 80° C. is or comprises isobornyl acrylate.

In exemplary formulation systems according to these embodiments, a total amount of the at least one hydrophilic curable material which provides, when hardened, a material featuring Tg higher than 80° C., is from 15 to 30 weight percents of the total weight of the formulation comprising same, including any intermediate values and subranges therebetween. In some of these embodiments, the at least one hydrophilic curable material which provides, when hardened, a material featuring Tg higher than 80° C. comprises at least one monofunctional curable material and/or at least one multifunctional curable material.

In some of these embodiments, an amount of the at least one monofunctional curable material ranges from 15 to 25, weight percents of the total weight of the formulation comprising same, including any intermediate values and subranges therebetween.

In some of these embodiments, an amount of the at least one multifunctional curable material ranges from 0 to 5, e.g., 3, weight percents of the total weight of the formulation comprising same, including any intermediate values and subranges therebetween. In exemplary embodiments, the multifunctional material is a trifunctional material, for example, an isocyanurate triacrylate.

In exemplary embodiments, the at least one hydrophilic curable material which provides, when hardened, a material featuring Tg higher than 50° C. is or comprises ACMO.

In exemplary formulation systems according to these embodiments, a total amount of the at least one hydrophobic curable material which provides, when hardened, a material featuring Tg lower than 25° C., if present, ranges from 0 to 15, or from 5 to 15, or from 10 to 15, weight percents, of the total weight of the formulation comprising same, including any intermediate values and subranges therebetween.

In some of these embodiments, the at least one hydrophobic curable material comprises at least one monofunctional curable material, and/or at least one multifunctional curable material.

In some of these embodiments, an amount of the at least one monofunctional curable material ranges from 0 to 5, or from 1 to 3, weight percents of the total weight of the formulation comprising same, including any intermediate values and subranges therebetween.

In some of these embodiments, an amount of the at least one multifunctional curable material ranges from 0 to 15, or from 5 to 15, or from 8 to 12, weight percents of the total weight of the at least one formulation.

In exemplary formulation systems according to these embodiments, a total amount of the at least one hydrophilic curable material which provides, when hardened, a material featuring Tg lower than 25° C., if present, ranges from 0 to 10, or from 1 to 10, or from 2 to 8, e.g., about 5, weight percents, of the total weight of the formulation comprising same, including any intermediate values and subranges therebetween.

In some of these embodiments, the at least one hydrophilic curable material which provides, when hardened, a material featuring Tg lower than 25° C., if present, comprises at least one monofunctional curable material and/or at least one multifunctional curable material, and in some embodiments, it comprises only monofunctional curable material(s) at an amount as described hereinabove.

In exemplary formulation systems according to these embodiments, the formulation further comprises a reactive diluent as described herein, at a concentration of from about 1 to about 10, or from about 3 to about 7, or from about 5 to about 7 weight percents of the total weight of the formulation, including any intermediate values and subranges therebetween.

Exemplary curable materials that are suitable for use in the context of these embodiments are presented in Table 1, below.

Elastomeric Materials

According to some of any of the embodiments described herein, at least one formulation in the formulation system of the present embodiments provides, when hardened, an elastomeric material, as defined herein.

Such formulations are suitable for use in additive manufacturing of an object which comprises, in at least a portion thereof, an elastomeric material.

In some of any of the embodiments described herein, formulations which provide elastomeric materials primarily comprise one or more elastomeric curable materials, as defined herein, and further comprise one or more of non-elastomeric materials, including hydrophilic and/or hydrophobic materials, as described herein, which may be selected so as to feature properties as indicated in the respective embodiments herein.

The phrase "elastomeric curable material" describes a curable material, as defined herein, which, upon exposure to a curing condition (e.g., curing energy), provides a cured material featuring properties of an elastomer (a rubber, or rubber-like material).

Elastomeric curable materials typically comprise one or more polymerizable (curable) groups, which undergo polymerization upon exposure to a suitable curing condition, linked to a moiety that confers elasticity to the polymerized and/or cross-linked material. Such moieties typically comprise alkyl, alkylene chains, hydrocarbon, alkylene glycol groups or chains (e.g., oligo or poly(alkylene glycol) as defined herein, urethane, oligourethane or polyurethane moieties, as defined herein, and the like, including any combination of the foregoing, and are also referred to herein as "elastomeric moieties".

An elastomeric mono-functional curable material according to some embodiments of the present invention can be a vinyl-containing compound represented by Formula I above, wherein at least one of $R_1$ and $R_2$ is and/or comprises an elastomeric moiety, as described herein.

For example, $R_1$ is or comprises an elastomeric moiety as defined herein and $R_2$ is, for example, hydrogen, C(1-4) alkyl, C(1-4) alkoxy, or any other substituent, as long as it does not interfere with the elastomeric properties of the cured material.

In some embodiments, $R_1$ is a carboxylate, and the compound is a mono-functional acrylate monomer. In some of these embodiments, $R_2$ is methyl, and the compound is mono-functional methacrylate monomer.

In some of any of these embodiments, the carboxylate group, —C(=O)—OR', comprises R' which is an elastomeric moiety as described herein.

In some embodiments, $R_1$ is amide, and the compound is a mono-functional acrylamide monomer. In some of these embodiments, $R_2$ is methyl, and the compound is mono-functional methacrylamide monomer.

(Meth)acrylates and (meth)acrylamides are collectively referred to herein throughout as (meth)acrylic materials.

In some embodiments, $R_1$ is a cyclic amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, the mono-functional curable compound of Formula I is an exemplary polymeric or oligomeric mono-functional curable material. Otherwise, it is an exemplary monomeric mono-functional curable material.

In multi-functional elastomeric materials, the two or more polymerizable groups are linked to one another via an elastomeric moiety, as described herein.

In some embodiments, a multifunctional elastomeric material can be represented by Formula I as described herein, in which $R_1$ comprises an elastomeric material that terminates by a polymerizable group, as described herein.

For example, a di-functional elastomeric curable material can be represented by Formula I*:

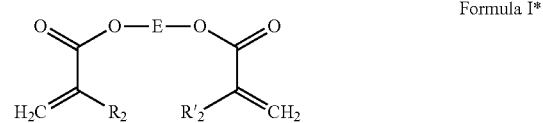

Formula I* wherein E is an elastomeric linking moiety as described herein, and $R'_2$ is as defined herein for $R_2$.

In another example, a tri-functional elastomeric curable material can be represented by Formula III:

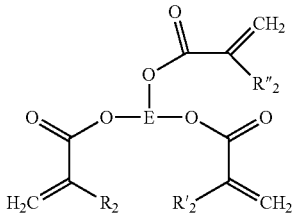

Formula III wherein E is an elastomeric linking moiety as described herein, and $R'_2$ and $R''_2$ are each independently as defined herein for $R_2$.

In some embodiments, a multi-functional (e.g., di-functional, tri-functional or higher) elastomeric curable material can be collectively represented by Formula IV:

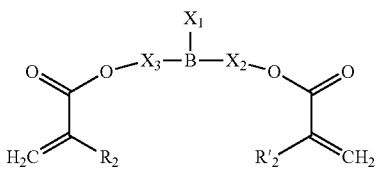

Formula IV

Wherein:
$R_2$ and $R'_2$ are as defined herein;
B is a di-functional or tri-functional branching unit as defined herein (depending on the nature of $X_1$);
$X_2$ and $X_3$ are each independently absent, an elastomeric moiety as described herein, or is selected from an alkyl, a hydrocarbon, an alkylene chain, a cycloalkyl, an aryl, an alkylene glycol, a urethane moiety, and any combination thereof; and
$X_1$ is absent or is selected from an alkyl, a hydrocarbon, an alkylene chain, a cycloalkyl, an aryl, an alkylene glycol, a urethane moiety, and an elastomeric moiety, each being optionally being substituted (e.g., terminated) by a meth(acrylate) moiety (O—C(=O) CR''$_2$=CH$_2$), and any combination thereof, or, alternatively, $X_1$ is:

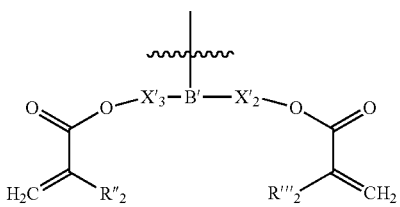

wherein:
the curved line represents the attachment point;
B' is a branching unit, being the same as, or different from, B;
$X'_2$ and $X'_3$ are each independently as defined herein for $X_2$ and $X_3$; and
$R''_2$ and $R'''_2$ are as defined herein for $R_2$ and $R'_2$.
provided that at least one of $X_1$, $X_2$ and $X_3$ is or comprises an elastomeric moiety as described herein.

The term "branching unit" as used herein describes a multi-radical, preferably aliphatic or alicyclic group. By "multi-radical" it is meant that the linking moiety has two or more attachment points such that it links between two or more atoms and/or groups or moieties.

That is, the branching unit is a chemical moiety that, when attached to a single position, group or atom of a substance, creates two or more functional groups that are linked to this single position, group or atom, and thus "branches" a single functionality into two or more functionalities.

In some embodiments, the branching unit is derived from a chemical moiety that has two, three or more functional groups. In some embodiments, the branching unit is a branched alkyl or a branched linking moiety as described herein.

Multi-functional elastomeric curable materials featuring 4 or more polymerizable groups are also contemplated, and can feature structures similar to those presented in Formula IV, while including, for example, a branching unit B with higher branching, or including an $X_1$ moiety featuring two (meth)acrylate moieties as defined herein, or similar to those presented in Formula III, while including, for example, another (meth)acrylate moiety that is attached to the elastomeric moiety.

In some embodiments, the elastomeric moiety, e.g., Ra in Formula I or the moiety denoted as E in Formulae I*, III and IV, is or comprises an alkyl, which can be linear or branched, and which is preferably of 3 or more or of 4 or more carbon atoms; an alkylene chain, preferably of 3 or more or of 4 or more carbon atoms in length; an alkylene glycol as defined herein, an oligo(alkylene glycol), or a poly(alkylene glycol), as defined herein, preferably of 4 or more atoms in length, a urethane, an oligourethane, or a polyurethane, as defined herein, preferably of 4 or more carbon atoms in length, and any combination of the foregoing.

In some of any of the embodiments described herein, the elastomeric curable material is a (meth)acrylic curable material, as described herein, and in some embodiments, it is an acrylate.

In some of any of the embodiments described herein, the elastomeric curable material is or comprises a mono-functional elastomeric curable material, and is some embodiments, the mono-functional elastomeric curable material is represented by Formula I, wherein $R_1$ is —C(=O)—OR' and R' is an alkylene chain (e.g., of 4 or more, preferably 6 or more, preferably 8 or more, carbon atoms in length), or a poly(alkylene glycol) chain, as defined herein.

In some embodiments, the elastomeric curable material is or comprises a multi-functional elastomeric curable material, and is some embodiments, the multi-functional elastomeric curable material is represented by Formula I*, wherein E is an alkylene chain (e.g., of 4 or more, or 6 or more, carbon atoms in length), and/or a poly(alkylene glycol) chain, as defined herein.

In some embodiments, the elastomeric curable material is or comprises a multi-functional elastomeric curable material, and is some embodiments, the multi-functional elastomeric curable material is represented by Formula III, wherein E is a branched alkyl (e.g., of 3 or more, or of 4 or more, or of 5 or more, carbon atoms in length).

In some of any of the embodiments described herein, the elastomeric curable material is an elastomeric acrylate or methacrylate (also referred to as acrylic or methacrylic elastomer), for example, of Formula I, I*, III or IV, and in some embodiments, the acrylate or methacrylate is selected such that when hardened, the polymeric material features a Tg lower than 0° C. or lower than −10° C.

Exemplary elastomeric acrylate and methacrylate curable materials include, but are not limited to, 2-propenoic acid, 2-[[(butylamino)carbonyl]oxy]ethyl ester (an exemplary urethane acrylate), and compounds marketed under the trade names SR335 (Lauryl acrylate) and SR395 (isodecyl acrylate) (by Sartomer). Other examples include compounds marketed under the trade names SR350D (a trifunctional trimethylolpropane trimethacrylate (TMPTMA), SR256 (2-(2-ethoxyethoxy)ethyl acrylate, SR252 (polyethylene glycol (600) dimethacrylate), SR561 (an alkoxylated hexane diol diacrylate) (by Sartomer). Additional examples include curable materials marketed as the Genomer family (e.g., Genomer 1122).

It is to be noted that other acrylic materials, featuring, for example, one or more acrylamide groups instead of one or more acrylate or methacrylate groups are also contemplated.

In some of any of the embodiment described herein, the elastomeric curable material comprises one or more monofunctional elastomeric curable material(s) (e.g., a monofunctional elastomeric acrylate, as represented, for example, in Formula I) and one or more multi-functional (e.g., difunctional) elastomeric curable materials(s) (e.g., a di-functional elastomeric acrylate, as represented, for example, in Formula I*, III or IV) and in any of the respective embodiments as described herein.

In some embodiments, the additional curable material is a mono-functional acrylate or methacrylate ((meth)acrylate). Non-limiting examples include isobornyl acrylate (IBOA), isobornylmethacrylate, acryloyl morpholine (ACMO), tetrahydrofutyl acrylate, phenoxyethyl acrylate, marketed by Sartomer Company (USA) under the trade name SR-339, urethane acrylate oligomer such as marketed under the name CN 131B, and any other acrylates and methacrylates usable in AM methodologies.

In some embodiments, the additional curable material is a multi-functional acrylate or methacrylate ((meth)acrylate). Non-limiting examples of multi-functional (meth)acrylates include propoxylated (2) neopentyl glycol diacrylate, marketed by Sartomer Company (USA) under the trade name SR-9003, Ditrimethylolpropane Tetra-acrylate (DiTMPTTA), Pentaerythritol Tetra-acrylate (TETTA), and Dipentaerythirtol Penta-acrylate (DiPEP), and an aliphatic urethane diacrylate, for example, such as marketed as Ebecryl 230. Non-limiting examples of multi-functional (meth) acrylate oligomers include ethoxylated or methoxylated polyethylene glycol diacrylate or dimethacrylate, ethoxylated bisphenol A diacrylate, polyethylene glycol-polyethylene glycol urethane diacrylate, a partially acrylated polyol oligomer, polyester-based urethane diacrylates such as marketed as CNN91.

In some of any of the embodiments described herein for a formulation that provides, when hardened, an elastomeric material, the formulation comprises:
one or more elastomeric curable material(s), as defined herein in any of the respective embodiments; and one or more mono-functional curable material(s).

In some embodiments, the formulation further comprises one or more difunctional curable material(s).

In some of any of the embodiments described herein for elastomeric materials, the one or more elastomeric curable material(s) comprise at least a monofunctional elastomeric curable material, as described herein. Optionally, the one or more elastomeric curable material(s) comprise, in addition, a multifunctional elastomeric curable material, e.g., an elastomeric difunctional material, as described herein.

In some of any of the embodiments described herein for elastomeric materials, a total amount of the elastomeric curable material(s) is at least 30, preferably at least 35, weight percents, of the total weight of a formulation comprising same. In some of any of the embodiments described herein for elastomeric materials, a total amount of the elastomeric curable material(s) ranges from about 30 to about 70, or from about 35 to about 65, weight percents of the total weight of the formulation comprising same, including any intermediate values and subranges therebetween.

In some of any of the embodiments described herein for elastomeric materials, a total amount of the one or more non-elastomeric monofunctional curable material(s) ranges from about 20 to about 60, or from about 30 to about 60, or from about 40 to about 60, or from about 45 to about 60, or from about 45 to about 55, or from about 50 to about 55, weight percents of the total weight of the formulation comprising same, including any intermediate values and subranges therebetween.

The monofunctional curable material according to these embodiments can be hydrophilic or hydrophobic, and can be such that provides, when hardened, a material featuring either Tg of at least 80° C. or Tg lower than 25° C.

In some embodiments, the monofunctional curable material(s) comprise one or more hydrophobic monofunctional curable material(s) that provide, when hardened, a material featuring Tg of at least 80° C. Exemplary such materials are described herein.

In some of these embodiments, an amount of hydrophobic monofunctional curable material(s) that provide, when hardened, a material featuring Tg of at least 80° C., ranges from about 20 to about 30, or from about 25 to about 30, weight percents of the total weight of the formulation comprising same, including any intermediate and subranges therebetween.

In some embodiments, the monofunctional curable material(s) comprise one or more hydrophobic monofunctional curable material(s) that provide, when hardened, a material featuring Tg lower than 25° C. Exemplary such materials are as described herein.

In some of these embodiments, an amount of hydrophobic monofunctional curable material(s) that provide, when hardened, a material featuring Tg lower than 25° C., is no more than 25 weight percents weight percents of the total weight of the formulation comprising same, and in some embodiments it is from about 10 to about 25 or from about 20 to about 25, weight percents, including any intermediate and subranges therebetween. Exemplary materials are presented in Table 2, below.

In some of these embodiments, an amount of hydrophilic monofunctional curable material(s) that provide, when hardened, a material featuring Tg lower than 25° C., is no more than 10 weight percents of the total weight of the formulation comprising same, and in some embodiments it is either absent or present in an amount of from about 5 to about 8, or from about 5 to about 6, weight percents, including any intermediate and subranges therebetween. Exemplary materials are presented in Table 2.

In some of any of the embodiments described herein for elastomeric material, a difunctional curable material, if present in the formulation, is in an amount of from about 1 to about 15 weight percents of the total weight of the formulation comprising same, including any intermediate values and subranges therebetween, and in some embodiments it is either absent or is in an amount of from 1 to 10, from 3 to 6, e.g., from about 4 to about 5, weight percents of the total weight of a formulation comprising same.

In some of these embodiments, the di-functional curable material(s) is a high molecular weight difunctional curable material, e.g., higher than 1000 grams/mol, or higher than 2000 grams/mol, or higher than 3000 grams/mol, or even higher.

In some of any of the embodiments described herein for elastomeric materials, the formulation optionally further comprises a non-reactive material, preferably a polymeric material that acts as a plasticizer, and is preferably featuring a viscosity, at room temperature, of no more than 15 centipoises or no more than 10 centipoises or no more than 5 centipoises. If present in the formulation, an amount of such a non-reactive material can range from 1 to 15, or from about 5 to about 15, or from about 5 to about 10, or from about 9 to about 10, weight percents, of the total weight of the formulation comprising same, including any intermediate value and subranges therebetween. Exemplary such materials include, but are not limited to, polypropylene glycols, polyethylene glycols, and like compounds, featuring molecular weight of from 300 to 1000 grams/mol.

In some of any of the embodiments described herein for elastomeric materials, the formulation system comprises two or more elastomeric modeling material formulations as described herein, which can differ from one another by the chemical composition of the curable materials, thus providing variable elastomeric properties, and/or by the chemical composition of non-curable materials.

According to some of any of the embodiments described herein for elastomeric materials, the formulation or formulation system provides, when hardened, an elastomeric material that is characterized by elongation of at least 200%, or of at least 250%, or of at least 280%, or of at least 290%, or even higher.

Additional Embodiments

According to some of any of the embodiments described herein, the formulation system consists of one formulation, unless otherwise indicated.

In some of any of the embodiments described herein, one or more of the modeling material formulation(s) further comprises an initiator, for initiating polymerization of the curable materials.

According to some of any of the embodiments described herein, all of the curable materials included in a formulation or formulation system as described herein are UV-curable materials, and in some embodiments, are UV-curable acrylic materials such as acrylates and/or methacrylates.

In some of these embodiments, the formulation system further comprises a photoinitiator. Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and benzoin alkyl ethers such as benzoin, benzoin methyl ether and benzoin isopropyl ether and the like. Examples of photoinitiators are alpha-amino ketone, bisacylphosphine oxide (BAPO's), and those marketed under the tradename Irgacure®.

A photo-initiator may be used alone or in combination with a co-initiator. Benzophenone is an example of a photoinitiator that requires a second molecule, such as an amine, to produce a free radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

A concentration of a photoinitiator in a formulation containing same may range from about 0.1 to about 5 weight percents, or from about 1 to about 5 weight percents, preferably from about 1 to about 3 weight percents, of the total weight of a formulation comprising same, including any intermediate value and subranges therebetween.

In some of any of the embodiments described herein, a modeling material formulation can further comprise, in addition to the components described hereinabove, one or more additional agents, which are referred to herein also as non-reactive materials.

Such agents include, for example, surface active agents, stabilizers, antioxidants, fillers, pigments, dispersants, and/or impact modifying agents (toughening agents or toughness modifiers).

In cases where the formulation system comprises two or more formulations, the non-reactive agents can be independently included in one or all of the modeling material formulations in the system.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties.

In some embodiments, a modeling formulation comprises a surface active agent and/or a dispersant. A surface-active agent may be used to reduce the surface tension of the formulation to the value required for jetting or for printing process, which is typically between 10 dyne/cm and 50 dyne/cm, for instance about 30 dyne/cm. An exemplary such agent is a silicone surface additive, e.g., of the BYK family.

In any of the exemplary modeling material formulations described herein, a concentration of a surfactant ranges from 0 to about 1% weight, and is, for example, 0, 0.01, 0.05, 0.1, 0.5 or about 1%, by weight, including any intermediate value therebetween, of the total weight of the formulation or formulation system comprising same.

In any of the exemplary modeling material formulations described herein, a concentration of a dispersant ranges from 0 to about 2% weight, and is, for example, 0, 0.1, 0.5, 0.7, 1, 1.2, 1.3, 1.35, 1.4, 1.5, 1.7, 1.8 or about 2%, by weight, including any intermediate value therebetween, of the total weight of the formulation or formulation system comprising same.

Suitable stabilizers (stabilizing agents) include, for example, thermal stabilizers, which stabilize the formulation at high temperatures.

In some embodiments, the modeling formulation comprises one or more pigments. In some embodiments, the pigment's concentration is lower than 35%, or lower than 25% or lower than 15%, by weight. In exemplary embodiments, an amount of a pigment in a formulation comprising same ranges from 0.1 to 5, or 1 to 5, or 1 to 3, or 1 to 2, % by weight of the total weight of a formulation comprising same.

The pigment may be a white pigment. The pigment may be an organic pigment or an inorganic pigment, or a metal pigment or a combination thereof.

In some embodiments the modeling formulation further comprises a dye.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

In some of any of the embodiments described herein, one or more of the modeling material formulations comprises a toughening agent.

Non-limiting examples of toughening agents include elastomeric materials. Representative examples include, without limitation, natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers. Preferred agents are elastomers such as polybutadienes. Toughening agents such as elastomeric materials can be added to the formulation by incorporating in a modeling material formulation an elastomeric material in a dispersed/dissolved phase.

A concentration of elastomeric materials may range from about 0.10 phr to about 10 phr, or from about 0.1 phr to about 5 phr, relative to the weight of the formulation containing same.

A concentration of elastomeric materials may alternatively range from about 0.1% to about 20%, by weight, of the total weight of a formulation containing same.

Other impact modifying agents, such as, for example, carbon fibers, carbon nanotubes, glass fibers, aramid Kevlar, polyparaphenylene benzobisoxazole Zylon, and other polar and non-polar impact modifiers, are also contemplated.

In some embodiments, one or more of the modeling material formulation(s) further comprises a polymerization inhibitor.

In any of the exemplary modeling material formulations described herein, a concentration of an inhibitor ranges from 0 to about 2% weight, or from 0 to about 1%, and is, for example, 0, 0.1, 0.2, 0.3, 0.4, 0.5, 0.6, 0.7, 0.8, 0.9 or about 1%, by weight, including any intermediate value therebetween, of the total weight of the formulation or a formulation system comprising same.

Modeling Material Formulation Providing, when Hardened, Non-Elastomeric (Rigid) Materials Table 1 below presents exemplary chemical compositions of modeling material formulations suitable for use in 3D inkjet printing of non-elastomeric (rigid) materials in, for example, single jetting and PolyJet technologies, including DM mode, and in D-ABS mode, for printing shelled objects, as both Part A formulation (RF) and part B formulation (DLM).

As described in detail in U.S. Patent Application having Publication No. 2013/0040091 and in PCT/IB2017/055696, by the present assignee, manufacturing of shelled objects is performed using two formulations: a first formulation, Part A, referred to also as RF (reinforcer); and a second formulation, Part B, referred to also as DLM.

Preferably, the first formulation (Part A, RF) provides, when hardened, a rigid material characterized by high HDT (e.g., higher than 70° C., or higher than 90° C.), and the second formulation (Part B, DLM) provides, when hardened, a material which is less rigid than the material obtained from a hardened first formulation (RF), and which is characterized by high toughness (e.g., Izod notch Impact higher than 30 J/mol, or higher of 35 J/mol, for example, of about 30-100 J/m), and HDT lower than the first hardened formulation RF (e.g., HDT of about 40-41° C.).

In Table 1, whenever there is no particular reference to the printing mode, the indicated concentrations are representative for all modes.

TABLE 1

| Component | Exemplary Materials | Percentage (%) |
|---|---|---|
| Hydrophobic curable (meth)acrylic material, characterized, when hardened, by Tg > 50° C. | IBOA (monofunctional) (Isobornyl acrylate; CAS:5888-33-5) (Tg = 95° C.) | Total: 25-60 Monofunctional: 30-55 Multifunctional: 0-25 For Single and PolyJet |
| | IBOMA (monofunctional) (Isobornyl methacrylate; CAS: 7534-94-3; SR 423D) (Tg = 175° C.) | Total: 50-60 Monofunctional: 30-60 Multifunctional: 0-25 For RF |
| | SR 833S (difunctional) (Tricyclodecanedimethanol Diacrylate; CAS: 42594-17-2) (Tg = 185° C.) | Total: 50-60 Monofunctional: 25-40 Multifunctional: 15-30 For DLM Total: 30-45 Monofunctional: 25-40 Multifunctional: 0-25 |
| Hydrophilic curable (meth)acrylic material, characterized, when hardened, by Tg > 50° C. | ACMO (Monofunctional) (Acryloyl Morpholine; CAS: 5117-12-4) (Tg = 145° C.) | Total: 15-35 Monofunctional: 15-30 Multifunctional: 0-5 For Single and PolyJet |
| | SR368 (Trifunctional) (Tris(2-Hydroxy Ethyl)Isocyanurate Triacrylate; CAS: 40220-08-4) (Tg = 272° C.) | Total: 15-30 Monofunctional: 15-25 Multifunctional: 0-5 For RF Total: 25-35 Monofunctional: 20-35 Multifunctional: 0-5 For DLM Total: 25-35 Monofunctional: 20-35 Multifunctional: 0-5 |

TABLE 1-continued

| Component | Exemplary Materials | Percentage (%) |
|---|---|---|
| Hydrophobic (meth)acrylic flexible material, characterized, when hardened, by Tg < 25° C. | SR 531 (Monofunctional) (Cyclic Trimethylopropane Formal Acrylate) CN131B (Monofunctional) (2-Hydroxy-3-phenoxypropyl prop-2-enoate) CN991 (Difunctional) (Aliphatic urethane diacrylate) | Total: 0-15 Monofunctional: 0-5 Multifunctional: 0-10 For Single and PolyJet Total: 0-15 Monofunctional: 0-5 Multifunctional: 5-15 For RF Total: 0-15 Monofunctional: 0-5 Multifunctional: 0-15 For DLM Total: 0-5 Monofunctional: 0-5 Multifunctional: 0-5 |
| Hydrophilic (meth)acrylic flexible material, characterized, when hardened, by Tg < 25° C. | SR 9036 (difunctional) (Ethoxylated (30) bisphenol A dimethacrylate; CAS: 41637-38-1) (Tg = −43° C.) SR415 (trifunctional) (Ethoxylated (20) Trimethylol propane triacrylate; CAS: 28961-43-5) (Tg = −40° C.) SR 9035 (Ethoxylated (15) Trimethylol propane triacrylate (Tg = −30° C.) | Total: 0-30 Difunctional: 0-5 Trifunctional: 0-30 For Single and PolyJet Total: 1-10 difunctional: 1-10 trifunctional: 0-5 For RF Total: 0-5 difunctional: 0-5 trifunctional: 0-5 For DLM Total: 10-30 difunctional: 0-5 trifunctional: 10-30 |
| Hydrophilic curable (meth)acrylic material, characterized, when hardened, by 80° C. > Tg > 25° C. | AgiSyn 1030 (difunctional) (Exo-1,7,7-trimethylbicyclo [2.2.1]hept-2-yl acrylate) (Tg = 60° C.) Photomer ® 6019 (Trifunctional) (Aliphatic urethane triacrylate) (Tg = 51° C.) | Total: 0-15 |
| Total hydrophilic curable materials | | 20-60 |
| Total hydrophobic curable materials | | 35-75 |
| Reactive diluent | DVE3 (Difunctional) (Triethyleneglycol divinyl ether) DVE2 (Difunctional) (Diethyleneglycol divinyl ether) | 0-10 (eg., 0-7) |
| Photoinitiator | BAPO type (Bis Acyl Phosphine Oxide) Alpha Hydroxy ketone MAPO (Monoacylphosphine oxides) | 1-3 (e.g., 1-2) |
| Surfactant/Dispersant | BYK Type (PDMS derivatives) | 0-1 |
| Inhibitor | MEHQ Genorad Type | 0.01-1 |
| Inorganic/Organic Pigment | Nano scale Titanium Oxide Nano scale Zirconium Oxide Nano Silica Nano scale Carbon black | 0-2 |

Modeling Material Formulation Providing, when Hardened, Elastomeric Materials

Table 2 below presents exemplary chemical compositions of modeling material formulations suitable for use in 3D inkjet printing of elastomeric materials, as defined herein, in, for example, single jetting and PolyJet technologies, including DM mode.

Generally speaking, exemplary formulations for forming elastomeric materials elastomeric curable materials, at a concentration of at least 30% by weight, combined with one or more non-elastomeric monofunctional curable materials, at a total weight of no more than 60% by weight, and optionally one or more non-elastomeric difunctional curable materials, at a total weight of no more than 10%, preferably no more than 6%, by weight, of the total weight of the formulation, and further optionally one or more non-reactive materials (non-reactive diluents) that feature low viscosity at room temperature (e.g., lower than 20 cPs).

TABLE 2

| Component | Exemplary Materials | Percentage (%) |
|---|---|---|
| Non-elastomeric Monofunctional curable (meth)acrylic material | IBOA (Isobornyl acrylate; CAS:5888-33-5) IBOMA (Isobornyl methacrylate; CAS: 7534-94-3; SR 423D) CN131B (2-Hydroxy-3-phenoxypropyl prop-2-enoate) SR285 (Tetrahydrofuryl Acrylate) | 20-60 |

TABLE 2-continued

| Component | Exemplary Materials | Percentage (%) |
|---|---|---|
| Non-elastomeric Difunctional curable (meth)acrylic material | SR 9036 (Ethoxylated (30) bisphenol A dimethacrylate; CAS: 41637-38-1) Ebecryl 230 (Aliphatic Urethane Diacrylate) | 0-6 |
| Elastomeric (meth)acrylic material | Genomer 1122 (2-[[(Butylamino)carbonyl]-oxy]ethyl acrylate) | 35-60 |
| Non-Reactive diluent | PPG600 | 0-15 |
| Photoinitiator | BAPO type (Bis Acyl Phosphine Oxide) Alpha Hydroxy ketone MAPO (Monoacylphosphine oxides) | 1-3 (e.g., 1-2) |
| Surfactant/Dispersant | BYK Type (PDMS derivatives) | 0-1 |
| Inhibitor | MEHQ Genorad Type | 0.01-1 |
| Inorganic/Organic Pigment | Nano scale Titanium Oxide Nano scale Zirconium Oxide Nano Silica Nano scale carbon black | 0-2 |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method of three-dimensional printing, comprising:
   operating a printing head having a nozzle array to dispense a building material formulation, wherein the printing head is directly connected to a cartridge containing the building material formulation, and wherein the printing head comprises a channel conveying a building material formulation received from said cartridge to said nozzle array;
   discarding said building material formulation from said channel; and
   connecting a cartridge containing a building material formulation that is different from said discarded building material formulation to said channel.

2. The method according to claim 1, wherein said printing head has a plurality of nozzle arrays dispensing at least two different building material formulations, wherein the printing head is directly connected to a plurality of cartridges each containing a different building material formulation, and wherein the printing head comprises a manifold with a plurality of channels, each conveying a building material formulation received from a separate cartridge to a separate nozzle array.

3. The method according to claim 2, wherein said discarding is of a first building material formulation from a first channel of said manifold, and wherein said connecting is while maintaining at least one type of building material formulation within at least one channel of said manifold other than said first channel.

4. The method according to claim 1, wherein at least one building material formulation is characterized by a viscosity of no more than 50 cPs at 25° C.

5. The method according to claim 1, wherein at least one building material formulation is a modeling material formulation system which comprises at least two curable materials and featuring a viscosity of no more than 50 cPs at 25° C., wherein an average molecular weight of said at least two curable materials is no more than 500 grams/mol.

6. The method according to claim 5, wherein said formulation system comprises at least one formulation which, when hardened, provides a non-elastomeric material, said at least one formulation comprising:
   at least one hydrophobic curable material which provides, when hardened, a material featuring Tg higher than 80° C.; and
   at least one hydrophilic curable material which provides, when hardened, a material featuring Tg higher than 80° C.

7. The method according to claim 5, wherein the formulation system comprises at least one formulation which, when hardened, provides an elastomeric material, said at least one formulation comprising:
   an elastomeric curable material; and
   a monofunctional curable material.

8. The method according to claim 7, wherein said at least one formulation comprises a difunctional curable material.

9. A three-dimensional printing system, comprising:
   a plurality of cartridges each containing a different building material formulation;
   a printing head having a plurality of nozzle arrays, and being directly connected to said plurality of cartridges, wherein the printing head comprises a manifold with a plurality of channels, each conveying a building material formulation received from a separate cartridge to a separate nozzle array; and
   a controller for operating said printing head;
   wherein the three-dimensional printing system is devoid of any printing head which is not directly connected to said plurality of cartridges.

10. The system of claim 9, further comprising a plurality of flow controlling devices, wherein said controller is configured to selectively control said flow controlling devices.

11. The system according to claim 9, wherein a number of said cartridges is larger than a number of said nozzles, and said manifold comprises M entry ports and N exit ports, wherein M>N, wherein M is a number of said cartridges, and wherein N is a number of said nozzle arrays.

12. The system of claim 11, further comprising a plurality of flow controlling devices, wherein said controller is configured to selectively control said flow controlling devices, to prevent flow of building material formulation out of at least one of said cartridges.

13. The system according to claim 10, wherein said controller is configured to operate at least one of said nozzle arrays to discard building material formulation from a respective channel, at a predetermined location, and to operate a flow controlling device to establish flow of building material formulation that is different from said discarded building material formulation into said respective channel.

14. The system according to claim 13, wherein said discarding is of a first building material formulation from a first channel of said manifold via a first nozzle array, and wherein said establishing said flow is for a second building material formulation while maintaining at least one type of building material formulation within at least one channel of said manifold other than said first channel.

15. The system according to claim 13, wherein said controller is configured to control said first nozzle array to dispense said first building material formulation and said second building material formulation at locations belonging to the same layer but during different passes of said printing head over said layer.

16. The system according to claim 13, wherein said predetermined location is on a working surface outside an area of said working surface at which a three-dimensional object is fabricated by the system.

17. The system according to claim 13, wherein said predetermined location is at an internal region of a three-dimensional object fabricated by the system.

18. The system according to claim 13, wherein said predetermined location in in sacrificial region within a volume in which a three-dimensional object is fabricated by the system.

19. The system according to claim 9, being devoid of any pre-heating systems that heat said building material outside said printing head.

20. The system according to claim 9, wherein said printing head is configured to dispense said building material formulation at a temperature of less than 50° C.

* * * * *